United States Patent
Freeman et al.

(10) Patent No.: US 10,703,009 B2
(45) Date of Patent: Jul. 7, 2020

(54) FINE PARTICLE SIZE BORIC ACID DISPERSION, METHOD OF USE IN ENGINEERED WOOD PRODUCT MANUFACTURE, METHOD OF COATING WOOD PRODUCTS AND PRODUCT THEREFROM

(71) Applicant: Polymer Solutions Group, Cleveland, OH (US)

(72) Inventors: Gary M. Freeman, Macon, GA (US); Quang T. Do, Kathleen, GA (US); Joshua D. Sparks, Macon, GA (US)

(73) Assignee: Polymer Solutions Group, Acworth, GA (US)

( * ) Notice: Subject to any disclaimer, the term of this patent is extended or adjusted under 35 U.S.C. 154(b) by 0 days.

(21) Appl. No.: 16/108,325

(22) Filed: Aug. 22, 2018

(65) Prior Publication Data
US 2020/0061865 A1     Feb. 27, 2020

(51) Int. Cl.
| | | |
|---|---|---|
| *B27K 3/16* | (2006.01) | |
| *C09K 21/02* | (2006.01) | |
| *C09K 21/00* | (2006.01) | |
| *B27K 3/12* | (2006.01) | |
| *B27K 3/52* | (2006.01) | |
| *B27K 3/36* | (2006.01) | |
| *C01B 35/10* | (2006.01) | |

(Continued)

(52) U.S. Cl.
CPC ............. *B27K 3/163* (2013.01); *B27K 3/12* (2013.01); *B27K 3/36* (2013.01); *B27K 3/52* (2013.01); *C01B 35/1054* (2013.01); *C08K 3/38* (2013.01); *C09K 21/00* (2013.01); *C09K 21/02* (2013.01); *C09K 21/06* (2013.01); *B27K 2240/30* (2013.01)

(58) Field of Classification Search
None
See application file for complete search history.

(56) References Cited

U.S. PATENT DOCUMENTS 4,801,404 A * 1/1989 Dietrich ................ B27K 3/163
                                                                252/607
6,273,928 B1   8/2001 Hayati et al.
(Continued)

OTHER PUBLICATIONS

Pedieu et al., "Fire-retardant properties . . . with boric acid", Eur. J. Wood. Prod. (2012) 70: 191-197.
(Continued)

*Primary Examiner* — Katie L. Hammer
(74) *Attorney, Agent, or Firm* — Clark & Brody LP

(57) ABSTRACT

An aqueous boric acid dispersion includes boric acid particles having a median particle size range of less than 44 microns and a solids content of boric acid particles of 50% or greater. The boric acid dispersion also includes an effective amount of at least one viscosity reducing agent such that the boric acid dispersion has an initial Brookfield 2 rpm static viscosity of about 5,000 to about 25,000 centipoise and a three week aged Brookfield 2 rpm static viscosity of less than 250,000 centipoise, an optional amount of an alkali metal base, wherein the alkali metal base/boric acid mole ratio in the boric acid dispersion ranges from zero to about 0.01; and the balance water. The boric acid dispersion can be used in the manufacture of wood products like oriented strand board, medium density fiberboard, and particle board as well as to coat wood products to improve their fire retardancy.

24 Claims, 3 Drawing Sheets

(51) Int. Cl.
*C08K 3/38* (2006.01)
*C09K 21/06* (2006.01)

(56) References Cited

U.S. PATENT DOCUMENTS

| | | |
|---|---|---|
| 6,306,317 B1 | 10/2001 | Richards et al. |
| 6,426,095 B2 | 7/2002 | Palmere et al. |
| 7,354,503 B2 | 4/2008 | Hume |
| 7,553,538 B2 | 6/2009 | Hume |
| 7,651,591 B1 | 1/2010 | Hume |
| 9,669,564 B2 | 6/2017 | Zhang et al. |
| 2003/0113514 A1* | 6/2003 | Saito ............... B41M 5/52 428/195.1 |
| 2007/0037714 A1* | 2/2007 | Olliges ........... C10M 169/04 508/155 |
| 2007/0278463 A1 | 12/2007 | Ratzsch et al. |
| 2011/0015104 A1* | 1/2011 | Olliges ........... C01M 169/04 508/160 |
| 2016/0257801 A1* | 9/2016 | Wiklund ........... C09K 21/02 |
| 2016/0304725 A1* | 10/2016 | Tadych ............. C09D 5/18 |

OTHER PUBLICATIONS

Wang et al., "Chemical mechanism of . . . acid on wood", Wood Sci Technol (2004) 38: 375-389.

* cited by examiner

FINE PARTICLE SIZE BORIC ACID DISPERSION, METHOD OF USE IN ENGINEERED WOOD PRODUCT MANUFACTURE, METHOD OF COATING WOOD PRODUCTS AND PRODUCT THEREFROM

FIELD OF THE INVENTION

The present invention relates to a fine particle size boric acid dispersion that includes a viscosity reducing agent and optionally an alkali base, and in particular to a fine particle boric acid dispersion that is stable, pumpable, and easily transported for use as a fire retardant additive in the manufacture of engineered wood products like oriented strand board, particle board, and medium density fiberboard and in coating applications of wood products to improve their flame spread performance.

BACKGROUND ART

In the prior art, it is known to use borates and boric acid as a fire retardant when manufacturing wood products like oriented strand board (hereinafter OSB), particle board (hereinafter PB), and medium density fiberboard (hereinafter MDF).

Flame spreadability or flame spread performance is often used as a measure of the fire retardancy of a given product. There are a number of different kinds of surface flammability tests used to assess the fire retardancy of materials and a description of these is found in a treatise on Analytical Chemistry, Part 3, Volume 4 edited by I. M. Kolthoff, Philip J. Elving, Fred H. Stross, published by John Wiley & Sons, Inc., Copyright 1977, Section D-1: Thermal and Chemical testing, Part iii, Section D-1, Surface flammability measurements for building materials and related products by Herbert W. Eickner, Forest Products Laboratory, US Dept. of Agriculture, Madison, Wis., which is hereby incorporated by reference in its entirety. One of the flame spreading tests is the Steiner tunnel or 25-ft tunnel furnace method (ASTM Standard E84-70), as developed by the Underwriters' Laboratories, as a rating method for measuring surface flammability of building materials. In this test, a flame spread index (FSI) is calculated based on the distance of the flame travel and the rate at which the flame front advances during a specified time of exposure. To have a class A fire rating, which is the best rating, the FSI should be in the range of 0-25. Class B has an FSI range of 30-75, and a Class C fire rating has an FSI range of 80-200. Typically, engineered wood products can only attain a Class C rating whereas pressure treated plywood would have a Class A rating using this test.

Another surface flame spread test is the radiant-panel method, which was developed as a result of seeking a faster laboratory scale testing method than the Steiner tunnel furnace method that would have some predictive correlation with E84 test results. This radiant-panel test method is ASTM Standard E162 (17).

An example of a boric acid dispersion for use as a fire retardant for wood products is found in U.S. Pat. No. 4,801,404 to Dietrich et al. (Dietrich). This patent discloses the use of a granular boric acid in a low-shear mixing process to yield a dispersion of boric acid having an average particle size of about 800 µm. The process uses some alkali base to facilitate the dispersion of the boric acid granules. The preferred molar ratio of boric acid to alkaline agent (namely NaOH) used to form a small amount of borate salt is claimed as being 1.0:0.01 to 1.0:0.20 (or 100:1 to 5:1) and in the one illustrative example, the molar ratio of boric acid/NaOH is 1.0:0.02 (or 50:1).

Dietrich teaches that the use of ground boric acid powders is disadvantageous in producing boric acid dispersions as it indicates that non-uniform particle size distributions are produced and that high viscosities are encountered such that dispersions of lower solids contents are only possible. Dietrich also suggests that the boric acid can be combined with a dispersant but provides no disclosure of any specific dispersant chemistries showing utility. However, the kinds of dispersions being produced by Dietrich are not stable over long time periods; they will hard pack settle and must be kept continuously agitated or be re-agitated at the time of use. Such dispersions would not be suitable for longer term storage in totes or tank trucks for subsequent transport to engineered wood board mills.

U.S. Pat. Nos. 7,354,503, 7,553,538 and 7,651,591 are directed to a fire retardant composite panel product and a method and system for fabricating same and are assigned to Sierra Pine. These patents principally cover an integrated process system located on site at a board mill whereby a boric acid/borax slurry is produced, feed through a high-shear mixing system or a colloid media mill to attrition down the particle size, and the resultant finer particle size material is then fed into a wood fiber line prior to the driers to yield a fire retardant MDF board. Other than a process flow diagram, there is no real process data or processing details provided. No target particle size range is disclosed from their high-shear mixing or media mill process. No dispersion solids range is provided and there is absolutely no mention of any processing additive chemistries.

The stability problem noted above for the dispersions produced in the Dietrich patent also exists when using a boric acid/borax combination like that disclosed in the Sierra Pine patents. Borax is a sodium borate (specifically disodium tetraborate decahydrate but this borate can also exist as lower hydrates such as the pentahydrate). Borate dispersions can crystallize into solidified masses upon standing, especially at higher concentrations and this also leads to a stability problem over time.

Another problem with the use of borates and boric acid is the homogeneity of the fire retardant additive in the wood product. That is, the boric acid or borate particles, as they are dense and large in size, can segregate in the wood product and not be dispersed within the engineered wood product in a homogenous way. This lack of homogeneity can affect the flame spread index (FSI) rating of the wood product such that it cannot achieve a Class A rating in E84 testing. This segregation problem can exist when applying coarse particle size dispersions of borates and boric acid but is particularly problematic when blending in the borates and boric acid in their dry powder or dry granular forms.

Further, even in instances having a fairly good mix of the boric acid or borate particles, in manufacturing processes where a pressing step is used, the fire retardants can subsequently segregate as a result of the pressing step and adequate fire retardancy may only exist on one side of the wood product.

To have maximum flame spread performance, pressure treated plywoods are preferred materials for building use. However, these kinds of plywoods are not without their disadvantages due to cost and due to the additives used during their manufacture that can cause some environmental concerns. Engineered wood products like OSB, particle wood, and MDF do not have the same environmental concerns as pressure treated plywoods as the chemicals used in the plywoods are not used in the engineered wood products. However, current engineered wood products for construction applications are inferior in their fire retardancy as compared to pressure treated plywoods. For example, many engineered wood products would only have a Class C fire rating for flame spread performance.

As such, there is a need to further improve the fire retardancy of engineered wood products so that they can better compete with pressure treated plywoods in the building and construction industry. In addition, efficient and economical methods are needed to meet the fire retardancy needs in other wood related applications such as furniture. The present invention responds to these needs by providing a boric acid dispersion that can improve the flame spread performance properties of engineered wood products and provide new types of engineered wood products as well.

SUMMARY OF THE INVENTION

In one embodiment, the invention relates to an improved boric acid dispersion that is designed to be used in methods of making engineered wood products like OSB, particle board, and MDF.

Another aspect of the invention is the use of the boric acid dispersion as the pigment masterbatch component in a waterborne coating product that is applied to the surface of a wood product to improve the wood product's flame spread performance. This use also produces an improved wood product by reason of the applied coating containing the boric acid dispersion on the wood product.

More particularly, the boric acid dispersion embodiment of the invention comprises an aqueous boric acid dispersion having boric acid particles with a median particle size range of less than 44 microns while also having a % solids content of boric acid particles of 50% or greater. The boric acid dispersion further comprises an effective amount of at least one viscosity reducing agent such that the boric acid dispersion has an initial Brookfield 2 rpm static viscosity of 5,000 to 25,000 centipoise and a three week aged Brookfield 2 rpm static viscosity of less than 250,000 centipoise, an optional amount of an alkali metal base, wherein the alkali metal base/boric acid mole ratio in the boric acid dispersion ranges from zero to about 0.01; and the balance water. The initial and aged static viscosity values are measured using a Brookfield RVDVE Heliopath viscometer unit equipped with the appropriate T-spindle (spindle number selection depending on the viscosity range being measured) and run at 2 rpm at 25° C. The reason that these viscosity measurements are characterized as static viscosity values is that they are measurements of the dispersion in a static condition, including when initially made and then after a three week aging period. Brookfield measurements run at 2 rpm with a T-spindle are indicative of the overall stability and pumpability of the boric acid dispersion. The boric acid dispersions of this invention exhibit thixotropic rheological behavior and are consequently shear-thinning fluids. An initial Brookfield 2 rpm static viscosity of 5,000-25,000 centipoise is needed in order to keep the dispersed boric acid particles well suspended in the dispersion over time. An aged Brookfield 2 rpm static viscosity that is less than 250,000 centipoise is needed in order to insure that the thixotropic gel that forms on standing can be readily broken down by the applied suction from a positive displacement transfer pump and consequently transformed into a flowable fluid that can be pumped out from storage totes or tanker truckers. The applied force needed to breakdown thixotropic gels into a flowable fluid is commonly referred to as the Yield Point. Therefore, the Yield Point of the aged boric acid dispersion should be low enough that pumpability after storage is still good and an aged Brookfield 2 rpm static viscosity that is less than 250,000 centipoise insures this pumpability requirement.

It should be noted that Brookfield measurements on the boric acid dispersions can also be conducted at 20 rpm. Measuring the boric acid dispersion at 20 rpm is more indicative of a dynamic viscosity value for the boric acid dispersion. Because the Brookfield 20 rpm viscosity measurement represents the flowability or flowable nature of the boric acid dispersion, this measure of viscosity is called a dynamic viscosity and it is useful information in discerning the potential flow rate of a boric acid dispersion as it is being pumped.

The Brookfield 2 rpm measurement is being made to determine the viscosity of the dispersion under essentially "static conditions" where a very low shear force is being applied. This low 2 rpm reading is particularly important when measuring the viscosity of the gels formed from aging under static conditions as it is essentially a measure of the gel's viscosity. In rheology terminology, the term kinematic viscosity is also used to define the measurement of a fluid's inherent resistance to flow when no external force, other than gravity, is acting on it. In contrast, the higher shear Brookfield 20 rpm measurement is measuring essentially a dynamic viscosity value. Dynamic viscosity is defined as the measurement of a fluid's resistance to flow when an external force is being applied. In the case when 20 rpm is used, the dynamic viscosity of the dispersion product is being measured in its flowable state as opposed to the viscosity reading at 2 rpm whereby the product is being measured in its non-flowing "static" gel state.

Therefore and besides having the initial and aged static viscosities as described above, it is preferred that the boric acid dispersion also exhibit a Brookfield at 20 rpm dynamic viscosity of less than 5,000 centipoise when initially made or after the boric acid dispersion has been stored for a period of time and then re-agitated. For purposes of clarity, re-agitation of an aged boric acid dispersion can take place as a result of the aged dispersion being mechanically stirred with some type of mixing system or can also occur as a consequence of the mechanical shear that is imparted by certain types of pumps during the act of pumping the aged dispersion. With the boric acid dispersion having this dynamic viscosity, it can be readily injected into wood fiber streams or spray applied onto wood raw material substrates such as chips or flakes. Therefore, another object of the invention is having a stable, high solids dispersion of boric acid that can be readily applied via injection or by spray application. The thixotropic behavior of the inventive boric acid dispersions helps to insure they meet both the stability and suspension requirements associated with storage and transport of the product as well as its subsequent ability to be injected or spray applied at the time of use at a wood panel manufacturing facility. The aged inventive boric acid dispersions when re-agitated or pumped will revert back to their initial viscosity values and upon standing will gradually increase in viscosity again in a similar manner and to a similar maximum viscosity.

The boric acid dispersion can also be characterized in terms of a thixotropic index (TI) value. The inventive boric acid dispersions exhibit thixotropic rheology properties which are unique and important characteristics of the dispersions. Their thixotropic properties are critical to their ability to be supplied in a stable form where good pigment suspension is achieved. In addition, the ability of the thixotropic gel produced under static aging conditions to be easily reverted back to a flowable fluid when exposed to shear forces (such as those applied from mechanical stirrers or through the mechanical action of pumps) is also equally important to its end-use utility. Thixotropic behavior can be easily quantified by means of determining a fluid's Thixotropic Index (TI) value. One way a TI value can be determined is by dividing two Brookfield viscosity readings that are recorded at least a factor of 10× apart in shear rate. So for a given dispersion dividing its Brookfield 2 rpm viscosity value by its Brookfield 20 rpm viscosity value yields a representative TI value that can be compared with the calculated TI value of another dispersion to assess their comparative thixotropic nature on a relative basis. The greater the calculated TI value is the more thixotropic the dispersion is; hence the observance of a high TI value is typically associated with the formation of gels. Thus, it is preferred that after aging, the boric acid dispersions having a Brookfield 2 rpm viscosity less than 250,000 centipoise should also be gels having a TI value less than or equal to 11.5.

While the solid content of the aqueous boric acid dispersion is preferred to be at least 50% solids, the solids content can be equal to or greater than 55%, and preferably equal to or greater than 60%. The ability to supply a high solids content dispersion (which is also stable and easily pumped) is advantageous from the standpoint of minimizing the amount of water being back added to the wood source in the engineered wood panel manufacturing facility. The moisture content of the wood fiber, chips or flakes has to be carefully controlled within certain limits during the wood panel manufacturing process otherwise panels with defects or performance deficiencies are produced.

The median particle size of the boric acid particles in the aqueous dispersion is preferably less than about 21 microns. In terms of a size range, a preferred median particle size range would be about 10-30 microns. The ability to supply a very fine particle size dispersion of boric acid is advantageous from the standpoint that the resultant surface area of the finer boric acid particles yields improved coverage of the starting wood raw materials and accordingly provides improved fire retardancy properties in the finished wood panel.

The viscosity reducing agent can be one or a combination of a number of different kinds of surfactants that provide the target initial and aged static viscosities and dynamic viscosity. These particular surfactants include those selected from the group consisting of a cationic type surfactant, an ethoxylated amine surfactant, a nonionic, anionic or amphoteric surfactant, and an ethoxylated phosphate ester surfactant.

For the cationic surfactant, more preferred surfactants include coco poly (15) oxyethylene methyl ammonium chloride, isodecyloxypropyl bis-(2-hydroxy-ethyl) methyl ammonium chloride, isotridecyloxypropyl bis-(2-hydroxy-ethyl) methyl ammonium chloride, and dicocoalkyldimethyl ammonium chloride.

For the ethoxylated amine surfactant, more preferred surfactants include poly (5) oxyethylene isodecyloxypropylamine, and poly (5) oxyethylene isotridecyloxypropylamine.

For the nonionic, anionic or amphoteric surfactant, more preferred surfactants include poly (6) oxyethylene $C_9$-$C_{11}$ aliphatic alcohol, poly (5) oxyethylene iso-$C_{13}$ alcohol, ethylene oxide/propylene oxide copolymer, polyethylene glycol 200, sodium octyliminodipropionate, and butanedioic acid, 2-sulfo-, 1,4-bis(2-ethylhexyl) ester, sodium salt.

For the phosphate ester surfactants, more preferred surfactants include oleyl 4(EO) phosphate ester and oleyl 6(EO) phosphate ester.

Especially preferred surfactants for the boric acid dispersion include coco poly (15) oxyethylene methyl ammonium chloride, poly (5) oxyethylene isodecyloxypropylamine, butanedioic acid, 2-sulfo-, 1,4-bis(2-ethylhexyl) ester, sodium salt, and oleyl 4(EO) phosphate ester. Interestingly, it should be noted here that all the preferred viscosity reducing agents for the inventive boric acid dispersion are surfactant based chemistries and are not polymeric dispersants.

When used, the alkali metal base can be any alkali metal base with NaOH and KOH being preferred. The alkali metal base/boric acid mole ratio can range from about 0.001 to about 0.007, and more preferably range between about 0.002 to about 0.006.

The aqueous boric acid dispersion can also include an additional surfactant and xanthan gum. The additional surfactant is a nonionic surfactant of intermediate HLB value that is preferably low foaming i (thereby minimizing the generation of foam during the manufacture of the boric acid dispersion) and is used in an effective amount to aid the wet-out and ease of dispersion of the xanthan gum additive. Low foam nonionic surfactants would be those characterized has typically exhibiting an initial Ross-Miles foam height value equal to or less than about 50 mm at a concentration level of 0.1% aqueous. The xanthan gum is also in an effective amount for improving the suspension properties of the boric acid particles in the dispersion (thereby preventing syneresis issues in the dispersion as it ages) and for improving adherence between a wood product and the boric acid particles used with the wood product to improve fire retardancy thereof. The improved adherence of the fine particle size boric acid particles when dispersions are injected or spray applied onto wood fiber, particles or flakes is an important performance benefit as it helps to prevent segregation issues during processing and subsequent pressing of the wood panels. The improved homogeneity of coverage with boric acid particles thereby results in wood panels with better and more consistent fire retardancy performance. When used, the amount of the nonionic surfactant in the boric acid dispersion can range from about 0.01 to about 0.25 wt. % and the amount of the xanthan gum in the boric acid dispersion can range from 0.01 to about 0.25 wt. %.

More narrowly defined target ranges for initial and aged Brookfield 2 rpm static viscosities for the boric acid dispersion can be employed. The initial Brookfield 2 rpm static viscosity can range between about 10,000 and about 20,000 centipoise and the three week aged Brookfield 2 rpm static viscosity can be 200,000 centipoise or less.

Another embodiment of the invention is the use of the boric acid dispersion to improve the fire retardancy of a wood product by providing a waterborne coating formulation employing the boric acid dispersion as the main pigment master batch component therein and applying the coating onto one or more surfaces of the wood product. The wood product can be any type of wood product suitable to accept a fire retardant coating formulation comprising boric acid and examples include OSB, particle board, and MDF as well as dimensional lumber products. The wood product would have an applied coating formulation covering at least one surface of the wood product, with the coating formulation comprising the inventive boric acid dispersion functioning as both a pigment and a fire retardant additive and an effective amount of a compatible waterborne binder to help bind the boric acid particles in the boric acid dispersion to the wood product being coated. The waterborne binder is designed to have a relatively neutral pH, have a minimum film formation temperature of 25° C. or less, and have a glass transition temperature less than 25° C. In a preferred mode, the waterborne binder can be about 10-40% by weight of the coating formulation.

Another embodiment of the invention along with the coated wood product is a method of coating a wood product to improve its fire retardancy. This method entails applying an effective amount of the coating formulation described above to at least one surface of the wood product to improve the fire retardancy of the wood product and form a coated wood product and then drying the coated wood product. This method can be used on any kind of wood product needing fire retardancy, including but not limited to particle board, oriented strand board, and medium density fiberboard as well as dimensional lumber materials.

Yet another embodiment of the invention is an improvement in the method of making wood products that use wood fiber, particles or flakes, an adhesive, and a fire retardant additive. The improvement is the use of the inventive boric acid dispersion as the fire retardant additive in these kinds of wood product manufacturing methods. The dispersion can be applied using any of the known methods for adding fire retardants when making wood products, e.g. spraying the dispersion on the wood product starting material, and the like. As with the coating method described above, any kind of a wood product that is in need of a fire retardant when being manufactured is a candidate for using of the inventive boric acid dispersion and examples of these wood products include particle board, oriented strand board, and medium density fiberboard.

DETAILED DESCRIPTION OF THE INVENTION

Figure 1:
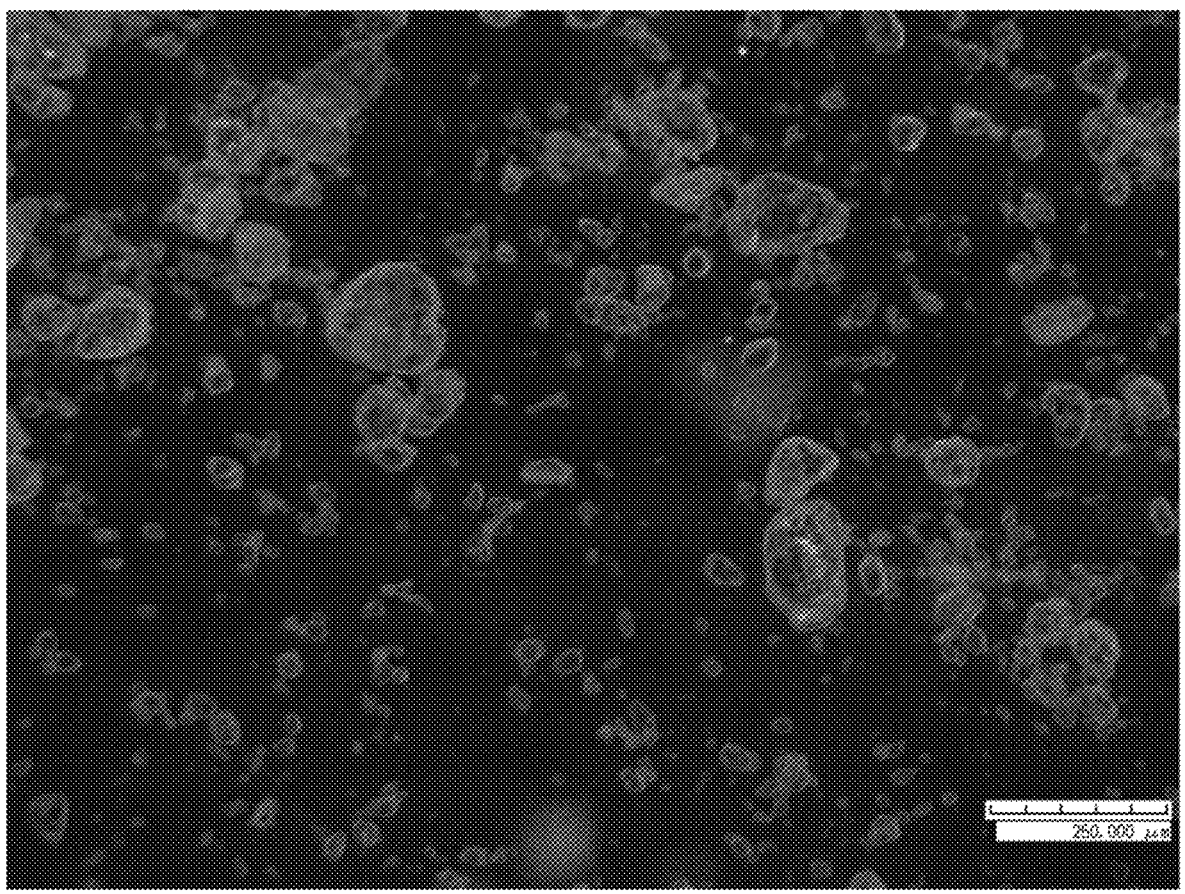
FIG. 1 is an aqueous suspension micrograph of a boric acid fine particle size dispersion.

The aqueous boric acid dispersion of the invention provides a significant advantage in that it combines a fine median particle size and a high solids content of boric acid in the dispersion with long term stability, i.e., the boric acid stays in suspension over a long period of time. As such, the boric acid dispersion can be transported in totes and tanker trucks to a wood panel product making facility and the wood product making facility does not have to invest in any manufacturing equipment to be able to supply a boric acid or borate as a fire retardant at its wood product manufacturing facility.

The boric acid dispersion also has a fine particle size of boric acid, which improves its distribution and surface coverage in any wood products using the dispersion for fire retardancy. Using the inventive dispersion results in a more homogenous distribution of the boric acid particles throughout the wood product and uniform surface coverage thereof and avoids the segregation problem that exists in prior art products that use larger size boric acid or borates, such segregation possibly compromising the flame spread index (FSI) properties of the finished wood product.

The boric acid dispersion as a fire retardant additive can be used in any known engineered wood product manufacturing processes. The processes include the manufacture of oriented strand board (OSB), particle board (PB), and medium density fiberboard (MDF) panels. As the manufacturing of these types of engineered wood products is well known in the art, a detailed description of the details of the wood product manufacturing is not needed for understanding of the invention.

The aqueous boric acid dispersion can be used in an effective amount in any of the wood product manufacturing process in order to improve the fire retardancy thereof. Examples of the application of the boric acid dispersion in these effective amounts in wood product manufacturing applications are detailed below.

Besides using the boric acid dispersion as a fire retardant additive in wood product manufacture, the boric acid dispersion can also be used as the main pigment component within a waterborne coating formulation to be applied to a wood product, such as OSB. In this embodiment, a coating process is employed that coats the surface of a wood product using the boric acid-containing coating formulation. A compatible waterborne organic binder is used with the boric acid particles to enhance the wood product's tire retardant properties and to facilitate the binding of the boric acid particles to the wood product. The organic binder can also affect other coating film properties such as flexibility and durability, the coating's ability to be nailed without cracking, its water and weather resistance properties and the like. The boric acid plus binder coating formulation can optionally contain other ingredients such as mineral pigments, colorants, titanium dioxide pigment, thickeners, surfactants, dispersing agents, preservatives, defoamers, solvents, etc. without departing from the spirit of the invention. The use of additional formulation ingredients largely depends on the end application and whether the coating is intended to be only fire retardant functional or fire retardant functional as well as decorative.

This embodiment also includes the product of the coating process, i.e., a coated wood product board, wherein the coating comprises the fine particle size boric acid particles and the binder. Typical applied coating film thicknesses for these types of products is 2-10 mils.

The inventive boric acid dispersion is made in water using a high shear mixing process that uses at least one viscosity-reducing agent. The viscosity reducing agent contributes to the ability to have a fine particle size in the dispersion, e.g., less than 44 μm for the median particle size, a solids content of the boric acid particles of at least 50% solids, and a stability as measured in terms of Brookfield initial and aged static viscosities and, optionally dynamic viscosity, which means that the boric acid particle dispersion remains dispersed, doesn't settle and is readily pumpable over time so that the dispersion can be effectively transported in bulk and not lose the dispersive characteristics when the dispersion is to be used later in a wood product making or coating application.

In a more preferred embodiment, the solids content of the boric acid particles in the boric acid dispersion can be up to 55% or even up to 60%. Providing a dispersion with excessive water, i.e., much less than 50% solids content, presents a moisture control problem for the wood panel manufacturer. It is therefore advantageous to minimize the amount of water being back added to the wood source being used in the engineered wood panel manufacturing facility. The moisture content of the wood fiber, chips or flakes has to be carefully controlled within certain limits during the wood panel manufacturing process otherwise panels with defects or performance deficiencies are produced.

In the formation of aqueous boric acid dispersions, two different dry starting materials are readily available from boric acid and borate producers. One is a technical grade (TG) granular material having crystalline particles predominantly falling within the 40-100 mesh size range (149-420 µm). The other is a pulverized powder of TG boric acid where about 61% of the particles are −200 mesh (or 61%<74 µm) in size. The comparative particle size properties of these possible dry boric acid starting materials are shown in Table 1A.

TABLE 1A

Typical Particle Size Properties of Technical Grade Boric Acid Raw Materials[a]

| US Standard Sieve Screen, mesh | Equivalent Particle Size Range in microns | TG Granular BA, Typical Wt. % | TG Powdered BA, Typical Wt. % |
| --- | --- | --- | --- |
| +40 | >420 µM | 4.8 | 0.0 |
| −40, +100 | <420 but >149 µM | 68.1 | 5.0 |
| −100, +200 | <149 but >74 µM | 23.5 | 32.3 |
| −200, +325 | <74 but >44 µM | 3.0 | 23.4 |
| −325 | <44 µM | 0.6 | 39.4 |

Note:
[a]BA is an abbreviation for boric acid. Reported sieve screen data supplied by National Boraxx Corporation of Cleveland, Ohio on their Technical Grade Granular and Powder Grade Boric Acids.

It is known that prior art dispersion processes teach that it is advantageous to utilize the TG granular boric acid in a low-shear mixing process and that the resultant high solids dispersion yields particles that are on average about 800 µm in size; see the Dietrich patent discussed above.

The inventive high-shear dispersion process and dispersion made therefrom preferably uses the TG boric acid pulverized powder as its starting material and this subsequently leads to making a much finer particle size dispersion of boric acid for fire retardant application uses.

Figure 2:
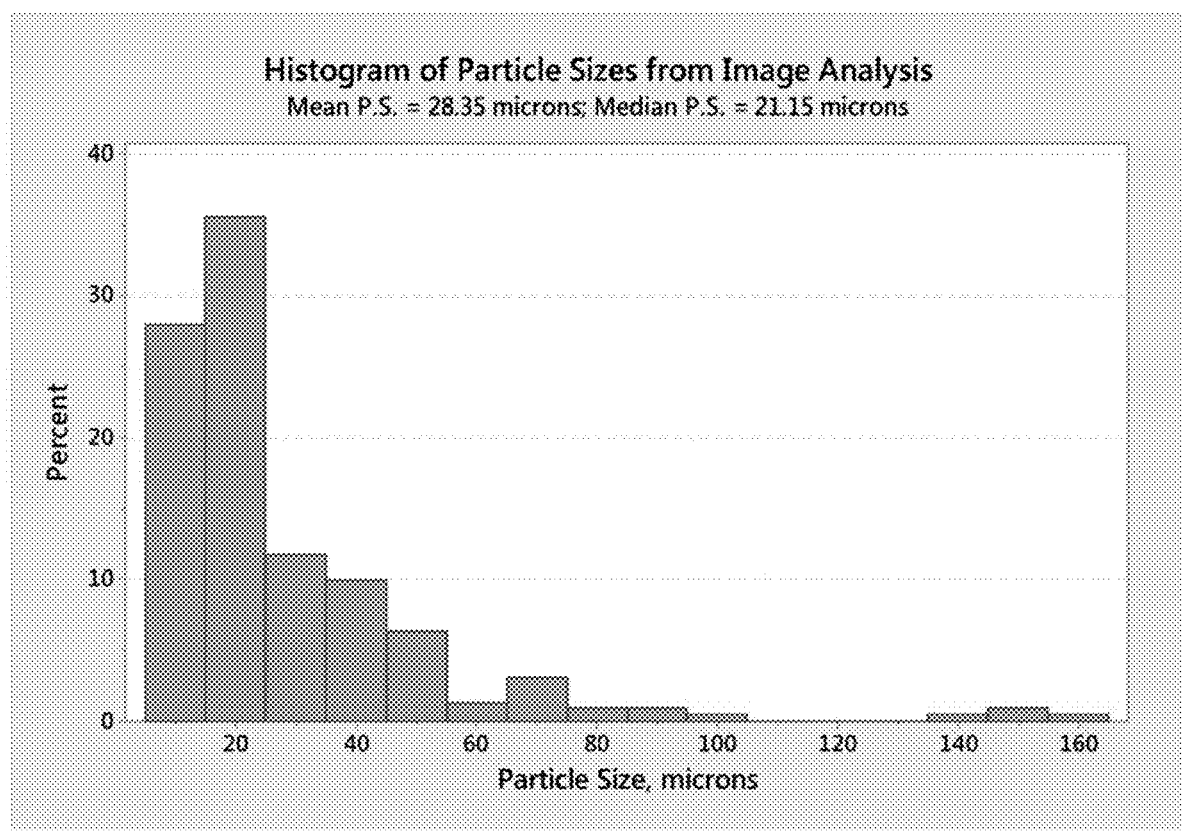
FIG. 2 is a histogram particle size analysis of the inventive boric acid dispersion by microscopic image analysis.

Microscopic examination of the aqueous dispersion produced by the inventive high-shear mixing process shows that the majority of the boric acid particles are <50 µm in size (as seen in the micrograph picture of FIG. 1 from illustrative example Expt. #1 as discussed below). Image analysis of the boric acid dispersion shown in the aforementioned micrograph, in fact, indicates that the median particle size is about 21 µm (see histogram analysis plot of FIG. 2). A target median particle size range of the boric acid particles in the inventive dispersion is 44 µm or less, with a more preferred median particle size range being between about 10 and 30 µm. The particle size distribution associated with this high solids dispersion of boric acid is therefore considerably finer in particle size than the particle size of the starting material of TG boric acid powder illustrating that significant attrition of the boric acid has occurred during the high-shear dispersion process. Attrition of the boric acid particle size is a consequence of the high-shear mixing conditions employed in the dispersion process acting in combination with the alkali base and the viscosity reducing agent. The histogram analysis plot (per FIG. 2) also indicates that the overall dispersion of boric acid is uniform in particle size distribution which is counter to the prior art teachings of Dietrich. Furthermore, the median particle size and particle size distribution associated with the inventive boric acid dispersion is significantly finer in particle size than anything previously described in the prior art for high solids dispersions of boric acid (high solids being boric acid solids contents ≥50%).

In such high solids aqueous dispersions of boric acid, the dispersion is a heterogeneous system whereby a portion of the boric acid is solubilized in water and the remaining boric acid is present as insoluble particulates suspended in that solution. The fraction of boric acid that is in solution is related to its reported solubility properties in water as a function of temperature (see solubility chart below taken from Rio Tinto's product literature).

| Solubility in water | | |
| --- | --- | --- |
| Temp ° C. | (° F.) | Boric acid % by weight in saturated solution |
| 0 | (32) | 2.52 |
| 5 | (42) | 2.98 |
| 10 | (50) | 3.49 |
| 20 | (68) | 4.72 |
| 25 | (77) | 5.46 |
| 30 | (86) | 6.23 |
| 35 | (95) | 7.12 |
| 40 | (104) | 8.08 |
| 45 | (113) | 9.12 |
| 50 | (122) | 10.27 |
| 55 | (131) | 11.55 |
| 60 | (140) | 12.97 |
| 65 | (149) | 14.42 |
| 70 | (158) | 15.75 |
| 80 | (176) | 19.10 |
| 85 | (185) | 21.01 |
| 90 | (194) | 23.27 |
| 95 | (203) | 25.22 |
| 100 | (212) | 27.53 |
| 103.3 | (217.9)* | 29.27 |

*Boiling point of solution

The high solids, fine particle boric acid dispersion of the invention entails the use of a high-shear dispersion process employing a Cowles or Hockmeyer style dispersion blade as generally outlined below. In general, the process of making the dispersion involves dispersing a series of boric acid aliquots into the batch along with an accompanying addition of small quantities of either KOH or viscosity reducing agent as part of the series of boric acid aliquots. This dispersion protocol aids in breakdown of the boric acid particles during the high shearing mixing of the boric acid aliquots and mitigates excessive viscosity build during the makedown process. While variations of this process are possible and will be evident to one skilled in the art, the essentials of the dispersion process are as follows:

1) A TG boric acid powder is preferably used as the starting material for the dispersion process.
2) A high-shear mixing system is employed to disperse the boric acid powder into water.
3) Deionized water is preferably used as the water in the process:
   a. hard water is not desirable because it contains divalent metal cations, such as $Ca^{+2}$ and $Mg^{+2}$, which can react with the solubilized boric acid to form calcium or magnesium borates; and
   b. soft water is also less desirable than using deionized water because water softener systems release $Na^+$ ions into the water as a result of the cation exchange process to remove the water hardness cations so that the total amount of $Na^+$ that is present or introduced during the dispersion should be minimized since sodium borates can be produced.
4) It is preferred that the starting deionized water to be used in the dispersion process should be chilled down to a starting temperature of about 12° C. Starting with chilled deionized water is helpful in keeping the maximum process temperature to a preferred level of below 30° C.
5) The total boric acid powder requirement should be added in several increments. Each incremental amount should be well dispersed before adding the next addition of boric acid.
6) In between boric acid powder additions, small amounts of KOH or other alkali base metal can be added to help lessen the dispersion's viscosity before adding the next incremental amount of boric acid. However, the total amount of KOH to be employed for the purposes of viscosity reduction should be controlled to be <0.01 on a KOH/BA mole ratio basis. KOH is the preferred alkali metal base to be used for these additions.
7) Near the end of the incremental boric acid addition and dispersion process, a small quantity of a viscosity reducing agent should be added to further reduce the batch's viscosity and to help stabilize it during subsequent storage and transport to end-use customer's facilities. This viscosity reducing agent is discussed in more detail below.
8) Finally, a pre-blend of a surfactant plus xanthan gum can be added and mixed in well and an adequate mixing time should be utilized to enable the xanthan gum to become well dispersed into the boric acid dispersion.
   a. An optional nonionic surfactant of intermediate HLB value, e.g., an HLB range of 6-14, can be used as the surfactant in the pre-blend of xanthan gum/surfactant to help wet the xanthan gum and allow for its easier dispersion into the boric acid dispersion. A particularly useful low foaming nonionic surfactant for this purpose is Surfynol 440 which is an ethoxylated 2,4,7,9-tetramethyl 5 decyn-4,7 diol which has a reported HLB value of 8.0.
   b. The xanthan gum serves a dual role in the boric acid dispersion fonnulation when used. It helps as a pigment suspension aide for the boric acid particles and also helps to stick the boric acid dispersion onto wood particles or chips when the dispersion is applied, e.g., spraying, onto them for end application use.
9) Care should be taken throughout the boric acid dispersion process that the maximum batch temperature not be allowed to exceed about 30° C. If necessary, the dispersion process can be conducted in a jacketed mixing vessel to help regulate the batch's process temperature.
   a. Given the temperature dependent solubility of boric acid, see the solubility chart above, it is desired to avoid forming a supersaturated solution that will tend to crystallize out a lot of boric acid when the batch subsequently cools off to room temperature. Mitigating recrystallization is important for preserving the overall product stability of the finished boric acid dispersions.

Table 1B provides a summary list of chemistries that have been evaluated as viscosity reducing agents for the boric acid dispersion as produced at 60% solids using a high-shear mixing procedure as outlined above where a KOH/BA mole ratio=0.004355 was employed.

TABLE 1B

Description of Dispersant & Surfactant Additives Tested in 60% Solids BA Dispersion[a]

| Chemical Tradename/ Supplier | Chemical or Generic Description | % Activity | Chemical Class & Comments |
|---|---|---|---|
| Tomamine Q-C-15/ Evonik | Coco poly (15) oxyethylene methyl ammonium chloride | 100% | Cationic Surfactant (Ethoxylated Quaternary Amine) |
| Tomamine Q-14-2/ Evonik | Isodecyloxypropyl bis-(2-hydroxy-ethyl) methyl ammonium chloride | 75% | Cationic Surfactant (Ethoxylated Quaternary Amine) |
| Tomamine Q-17-2/ Evonik | Isotridecyloxypropyl bis-(2-hydroxyethyl) methyl ammonium chloride | 75% | Cationic Surfactant (Ethoxylated Quaternary Amine) |
| Arquad 2C-75/Akzo Nobel | Dicocoalkyldimethyl ammonium chloride | 75% | Cationic Surfactant (Quaternary Amine but No Ethoxylation) |
| Tomamine E-14-5/ Evonik | Poly (5) oxyethylene isodecyloxypropylamine | 100% | Ethoxylated Amine Surfactant |
| Tomamine E-17-5/ Evonik | Poly (5) oxyethylene isotridecyloxypropylamine | 100% | Ethoxylated Amine Surfactant |
| Edaplan 397/ Munzing | Blend of Polyglycol Esters | 100% | Nonionic Polymeric Dispersant |
| Edaplan 494/ Munzing | Copolymer with pigment affinic groups | 50% | Anionic Polymeric Dispersant |
| Edaplan 490/ Munzing | Copolymer with pigment affinic groups | 40% | Nonionic Polymeric Dispersant |
| Zetasperse 3600/ Evonik | Electrosteric Dispersant & Grind Aide | 52% | Anionic Polymeric Dispersant |
| Zetasperse 1200/ Evonik | Dynamic Wetter + Anionic Dispersant Polymer | 45% | Nonionic & Anionic Polymeric Dispersant |
| Zetasperse 170/Evonik | Blend of Ethoxylated $C_6$-$C_{12}$ Alcohols + Polyoxyalkylene amine derivative | 100% | Nonionic Wetting Agent & Steric Stabilizer for Acidic Pigments |

TABLE 1B-continued

Description of Dispersant & Surfactant Additives Tested in 60% Solids BA Dispersion[a]

| Chemical Tradename/ Supplier | Chemical or Generic Description | % Activity | Chemical Class & Comments |
|---|---|---|---|
| Acumer 3100/ Dow Chemical | Carboxylate/Sulfonate/Nonionic Functional Teipolymer | 40% | Polymeric Dispersant |
| Flosperse 9000/SNF | Sodium Polyacrylate | 40% | Anionic Polymeric Dispersant |
| Tamol SN/ Dow Chemical | Sodium Naphthalene Sulfonate | 94% | Anionic Dispersing Agent |
| E-Sperse 100/ Ethox Chemical | Proprietary Dispersing Agent | 71.5% | Anionic Dispersing Agent |
| T-DETA 91-6/Harcros | Poly (6) oxyethylene $C_9$-$C_{11}$ aliphatic Alcohol | 100% | Nonionic Wetting Agent |
| Ethal TDA-5/ Ethox Chemical | Poly (5) oxyethylene iso-$C_{13}$ Alcohol | 100% | Nonionic Wetting Agent |
| T-DET EPO-62/Harcros | Ethylene Oxide/Propylene Oxide Copolymer | 100% | Polymeric Nonionic Wetting Agent |
| Lumulse PEG200/ Vantage | Polyethylene Glycol 200 | 100% | Polymeric Nonionic Wetting Agent |
| DeTERIC ODP-LF/ DeForest | Sodium Octyliminodipropionate | 50% | Amphoteric Surfactant |
| ChemWet 75/ BYK | Butanedioic acid, 2-sulfo-, 1,4-bis(2-ethylhexyl) ester, sodium salt; also known as Na DOSS | 75% | Anionic Wetting Agent |
| Ethfac 140/ Ethox Chemical | Oleyl 4(EO) Phosphate Ester | 100% | Phosphate Ester Wetting Agent |
| Ethfac 161/ Ethox Chemical | Decyl 6(EO) Phosphate Ester | 100% | Phosphate Ester Wetting Agent |

Table Notes:
[a] All dispersion batches of TG Boric Acid Powder were made using the high-shear mixing procedure described above. Surfactants and chemical dispersants listed herein were tested as the viscosity reduction additive. All surfactants and chemical dispersants were utilized on an equivalent active weight basis.

In addition, the viscosity reduction and stabilizing effect that each chemistry additive had on the fine particle size boric acid dispersion as it aged was assessed. The additive chemistries were all evaluated at an equivalent active dosage level of 0.12% by wt. in the dispersion process. The additive chemistries tested included the following types:

Various Surfactants (Nonionic, Anionic, Amphoteric and Cationic types)
Dispersants (Polymeric Anionic and Anionic/Nonionic types)
Phosphate Esters The dispersion results from testing the additive chemistries listed in Table 1B are summarized in Table 1C.

TABLE 1C pH and Brookfield Viscosity Tracking Results for 60% Solids, High-Shear BA Dispersions[a]

| Expt. #/ Chemical Tradename/ Supplier | Specific Gravity[c] (g/ml) | Initial pH & BF Visc.[b], cps | Aged pH & BF Visc.[b], cps (after 3 days) | Aged pH & BF Visc.[b], cps (after 1 week) | Aged pH & BF Visc.[b], cps (after 2 weeks) | Aged pH & BF Visc.[b], cps (after 3 weeks) | Experimental Observations & Comments |
|---|---|---|---|---|---|---|---|
| | | Experiments with Cationic Surfactants | | | | | |
| #1) Tomamine Q-C-15/Evonik | 1.2025 | Sp #91 2 rpm = 16,100 20 rpm = 3,410 pH = 5.90 | Sp #91 2 rpm = 57,000 20 rpm = 9,140 pH = 5.77 | Sp #92 2 rpm = 73,800 20 rpm = 9,480 pH = 5.79 | Sp #92 2 rpm = 119,000 20 rpm = 16,640 pH = 5.81 | Sp #93 2 rpm = 180,000 20 rpm = 22,750 pH = 5.76 | Manageable Process Viscosity & Pumpable after Aging |
| #2) Tomamine Q-14-2/Evonik | 1.2376 | Sp #91 2 rpm = 10,300 20 rpm = 1,900 pH = 5.95 | Tracking Stopped | NA | NA | NA | ~1/8" Layer of Clear Syneresis Oserved after 24 hrs. |

TABLE 1C-continued pH and Brookfield Viscosity Tracking Results for 60% Solids, High-Shear BA Dispersions[a]

| Expt. #/ Chemical Tradename/ Supplier | Specific Gravity[c] (g/ml) | Initial pH & BF Visc.[b], cps | Aged pH & BF Visc.[b], cps (after 3 days) | Aged pH & BF Visc.[b], cps (after 1 week) | Aged pH & BF Visc.[b], cps (after 2 weeks) | Aged pH & BF Visc.[b], cps (after 3 weeks) | Experimental Observations & Comments |
|---|---|---|---|---|---|---|---|
| #3) Tomamine Q-17-2/Evonik | 1.2449 | Sp #91 2 rpm = 21,500 20 rpm = 2,500 pH = 5.91 | Tracking Stopped | NA | NA | NA | ~¼" Layer of Clear Syneresis Observed after 24 hrs. |
| #4) Arquad 2C-75/Akzo Nobel | 1.2234 | Sp #91 2 rpm = 14,000 20 rpm = 2,670 pH = 5.88 | Tracking Stopped | NA | NA | NA | ~½" Layer of Clear Syneresis Observed after 24 hrs. |
| Experiments with Ethoxylated Amine Surfactant | | | | | | | |
| #5) Tomamine E-14-5/Evonik | 1.2354 | Sp #91 2 rpm = 12,900 20 rpm = 2,500 pH = 5.90 | Sp #91 2 rpm = 40,200 20 rpm = 6,600 pH = 5.79 | Sp #91 2 rpm = 50,400 20 rpm = 8,030 pH = 5.73 | Sp #92 2 rpm = 77,200 20 rpm = 10,200 pH = 5.82 | Sp #93 2 rpm = 210,500 20 rpm = 19,450 pH = 5.74 | Slight Syneresis Observed after 3 Weeks |
| #6) Tomamine E-17-5/Evonik | 1.2302 | Sp #91 2 rpm = 33,600 20 rpm = 3,300 pH = 5.95 | Tracking Stopped | NA | NA | NA | Notable Syneresis Observed within 2 hrs. |
| Experiments with Pigment Dispersants (Anionic & Nonionic Types) | | | | | | | |
| #7) Edaplan 397/ Munzing | 1.2378 | Sp #91 2 rpm = 21,000 20 rpm = 3,890 pH = 5.94 | Sp #92 2 rpm = 152,000 20 rpm = 19,660 pH = 5.79 | Sp #93 2 rpm = 355,000 20 rpm = 38,500 pH = 5.73 | Sp #94 2 rpm = 830,000 20 rpm = 68,900 pH = 5.74 | Sp #96 2 rpm = 1,470,000 20 rpm = 103,000 pH = 5.74 | Unpumpable |
| #8) Edaplan 494/ Munzing | 1.239 | Sp #91 2 rpm = 24,600 20 rpm = 4,440 pH = 5.94 | Sp #92 2 rpm = 114,200 20 rpm = 14,360 pH = 5.80 | Sp #92 2 rpm = 157,800 20 rpm = 18,120 pH = 5.73 | Sp #93 2 rpm = 404,000 20 rpm = 36,700 pH = 5.75 | Sp #93 2 rpm = 482,000 20 rpm = 38,700 pH = 5.78 | Poor Pumpability |
| #9) Edaplan 490/ Munzing | 1.2509 | Sp #91 2 rpm = 21,900 20 rpm = 4,040 pH = 5.91 | Sp #92 2 rpm = 84,400 20 rpm = 11,320 pH = 5.73 | Sp #92 2 rpm = 127,000 20 rpm = 16,580 pH = 5.95 | Sp #93 2 rpm = 245,000 20 rpm = 23,000 pH = 5.75 | Sp #93 2 rpm = 273,000 20 rpm = 24,800 pH = 5.74 | Fair Pumpability |
| #10) Zetasperse 3600/Evonik | 1.2394 | Sp #91 2 rpm = 22,500 20 rpm = 4,350 pH = 5.89 | Sp #92 2 rpm = 90,400 20 rpm = 12,700 pH = 5.74 | Sp #92 2 rpm = 125,600 20 rpm = 16,280 pH = 5.88 | Sp #93 2 rpm = 220,500 20 rpm = 24,300 pH = 5.74 | Sp #93 2 rpm = 299,000 20 rpm = 29,700 pH = 5.77 | Fair Pumpability |
| #11) Zetasperse 1200/Evonik | 1.2439 | Sp #91 2 rpm = 23,000 20 rpm = 4,250 pH = 5.90 | Sp #92 2 rpm = 98,600 20 rpm = 13,140 pH = 5.73 | Sp #92 2 rpm = 160,200 20 rpm = 19,160 pH = 5.86 | Sp #93 2 rpm = 321,500 20 rpm = 33,000 pH = 5.73 | Sp #93 2 rpm = 475,500 20 rpm = 42,900 pH = 5.75 | Poor Pumpability |
| #12) Zetasperse 170/Evonik | 1.2156 | Sp #91 2 rpm = 20,300 20 rpm = 3,720 pH = 5.85 | Sp #92 2 rpm = 113,200 20 rpm = 14,460 pH = 5.89 | Sp #92 2 rpm = 197,500 20 rpm = 22,600 pH = 5.83 | Sp #93 2 rpm = 326,000 20 rpm = 31,000 pH = 5.71 | Sp #93 2 rpm = 428,000 20 rpm = 35,150 pH = 5.65 | Poor Pumpability |
| #13) Acumer 3100/Dow Chemical | 1.2442 | Sp #91 2 rpm = 31,200 20 rpm = 5,020 pH = 5.94 | Sp #92 2 rpm = 131,200 20 rpm = 16,140 pH = 5.80 | Sp #93 2 rpm = 261,500 20 rpm = 27,250 pH = 5.78 | Sp #93 2 rpm = 449,000 20 rpm = 39,300 pH = 5.77 | Sp #93 2 rpm = 486,500 20 rpm = 40,750 pH = 5.76 | Poor Pumpability |
| #14) Flosperse 9000/SNF | 1.2451 | Sp #91 2 rpm = 28,100 20 rpm = 4,750 pH = 5.95 | Sp #92 2 rpm = 128,000 20 rpm = 16,200 pH = 5.93 | Sp #92 2 rpm = 236,000 20 rpm = 26,600 pH = 5.85 | Sp #93 2 rpm = 328,500 20 rpm = 34,600 pH = 5.84 | Sp #93 2 rpm = 446,000 20 rpm = 59,800 pH = 5.84 | Poor Pumpability |

TABLE 1C-continued pH and Brookfield Viscosity Tracking Results for 60% Solids, High-Shear BA Dispersions[a]

| Expt. #/ Chemical Tradename/ Supplier | Specific Gravity[c] (g/ml) | Initial pH & BF Visc.[b], cps | Aged pH & BF Visc.[b], cps (after 3 days) | Aged pH & BF Visc.[b], cps (after 1 week) | Aged pH & BF Visc.[b], cps (after 2 weeks) | Aged pH & BF Visc.[b], cps (after 3 weeks) | Experimental Observations & Comments |
|---|---|---|---|---|---|---|---|
| #15) Tamol SN/Dow Chemical | 1.2434 | Sp #91 2 rpm = 33,900 20 rpm = 6,260 pH = 5.87 | Sp #92 2 rpm = 124,600 20 rpm = 16,280 pH = 5.74 | Sp #93 2 rpm = 265,500 20 rpm = 29,350 pH = 5.88 | Sp #93 2 rpm = 390,000 20 rpm = 37,450 pH = 5.75 | Sp #93 2 rpm = 493,500 20 rpm = 45,200 pH = 5.75 | Poor Pumpability |
| #16) E-Sperse 100/ Ethox Chemical | 1.2321 | Sp #91 2 rpm = 23,100 20 rpm = 4,280 pH = 5.90 | Sp #92 2 rpm = 113,800 20 rpm = 14,700 pH = 5.81 | Sp #92 2 rpm = 149,000 20 rpm = 18,200 pH = 5.88 | Sp #93 2 rpm = 360,000 20 rpm = 35,150 pH = 5.75 | Sp #93 2 rpm = 414,500 20 rpm = 38,050 pH = 5.74 | Poor Pumpability |
| Experiments with Nonionic, Anionic or Amphoteric Type Surfactants ||||||||
| #17) T-DET A 91-6/ Harcros | 1.1867 | Sp #91 2 rpm = 24,000 20 rpm = 4,060 pH = 5.86 | Sp #92 2 rpm = 94,200 20 rpm = 12,620 pH = 5.80 | Sp #92 2 rpm = 123,400 20 rpm = 16,260 pH = 5.89 | Sp #93 2 rpm = 293,000 20 rpm = 32,800 pH = 5.71 | Sp #93 2 rpm = 359,000 20 rpm = 32,450 pH = 5.74 | Poor Pumpability |
| #18) Ethal TDA-5/ Ethox Chemical | 1.223 | Sp #91 2 rpm = 19,200 20 rpm = 3,570 pH = 5.86 | Sp #92 2 rpm = 87,200 20 rpm = 12,200 pH = 5.85 | Sp #93 2 rpm = 168,500 20 rpm = 20,400 pH = 5.85 | Sp #93 2 rpm = 290,000 20 rpm = 30,500 pH = 5.74 | Sp #93 2 rpm = 448,000 20 rpm = 38,200 pH = 5.72 | Poor Pumpability |
| #19) T-DET EPO-62/ Harcros | 1.2455 | Sp #91 2 rpm = 30,800 20 rpm = 4,900 pH = 5.88 | Sp #92 2 rpm = 160,600 20 rpm = 18,600 pH = 5.90 | Sp #93 2 rpm = 266,000 20 rpm = 30,200 pH = 5.86 | Sp #93 2 rpm = 411,000 20 rpm = 37,450 pH = 5.76 | Sp #94 2 rpm = 867,000 20 rpm = 55,400 pH = 5.70 | Unpumpable |
| #20) Lumulse PEG200/ Vantage | 1.2492 | Sp #91 2 rpm = 36,000 20 rpm = 5,440 pH = 5.83 | Sp #92 2 rpm = 156,200 20 rpm = 18,220 pH = 5.88 | Sp #93 2 rpm = 252,000 20 rpm = 26,000 pH = 5.82 | Sp #93 2 rpm = 357,000 20 rpm = 32,500 pH = 5.71 | Sp #93 2 rpm = 462,500 20 rpm = 37,650 pH = 5.70 | Poor Pumpability |
| #21) DeTERIC ODP-LF/ DeForest | 1.2414 | Sp #91 2 rpm = 35,200 20 rpm = 5,550 pH = 5.90 | Sp #92 2 rpm = 149,600 20 rpm = 18,160 pH = 5.89 | Sp #93 2 rpm = 235,500 20 rpm = 27,950 pH = 5.85 | Sp #93 2 rpm = 337,000 20 rpm = 29,550 pH = 5.73 | Sp #93 2 rpm = 442,500 20 rpm = 35,150 pH = 5.66 | Poor Pumpability |
| #22) ChemWet 75/ BYK | 1.2415 | Sp #91 2 rpm = 23,400 20 rpm = 4,290 pH = 5.95 | Sp #91 2 rpm = 55,900 20 rpm = 9,210 pH = 5.90 | Sp #92 2 rpm = 85,400 20 rpm = 11,060 pH = 5.79 | Sp #92 2 rpm = 123,800 20 rpm = 15,440 pH = 5.74 | Sp #93 2 rpm = 221,500 20 rpm = 21,750 pH = 5.72 | Fair Pumpability |
| Experiments with Ethoxylated Phosphate Ester Surfactants ||||||||
| #23) Ethfac 140/Ethox Chemical | 1.2301 | Sp #91 2 rpm = 19,000 20 rpm = 3,640 pH = 5.88 | Sp #92 2 rpm = 62,800 20 rpm = 10,400 pH = 5.89 | Sp #92 2 rpm = 76,800 20 rpm = 12,120 pH = 5.83 | Sp #93 2 rpm = 148,000 20 rpm = 20,150 pH = 5.74 | Sp #93 2 rpm = 172,000 20 rpm = 20,700 pH = 5.63 | Manageable Process Viscosity & Pumpable after Aging |
| #24) Ethfac 161/Ethox Chemical | 1.2159 | Sp #91 2 rpm = 27,500 20 rpm = 4,770 pH = 5.87 | Sp #92 2 rpm = 92,800 20 rpm = 11,900 pH = 5.89 | Sp #92 2 rpm = 138,200 20 rpm = 15,220 pH = 5.80 | Sp #93 2 rpm = 281,000 20 rpm = 27,250 pH = 5.73 | Sp #93 2 rpm = 233,500 20 rpm = 34,900 pH = 5.64 | Fair Pumpability |

Note:
[a]All boric acid dispersions were produced using TG boric acid powder and high-shear mixing conditions in accordance with the dispersion process outlined above. Variable being explored in these dispersion experiments was the specific surfactant or dispersant chemistry employed. All test batches were produced at a KOH/BA mole ratio of 0.004355.
[b]All boric acid dispersions were subsequently aged and retested at 25 ± 1° C. Brookfield Viscosities were measured using a Brookfield RVDVE Heliopath Viscometer Unit equipped with T-spindles run at 2 rpm and then 20 rpm; T-spindles A (#91) through F (#96) were employed as required.
[c]Specific gravities were determined using a 100 ml specific gravity cup in accordance with ASTM D1475.

The initial static and dynamic viscosity of each test batch was determined and if the resultant boric acid dispersion was viable, it was subsequently viscosity tracked as it aged over a three (3) week time period. All dispersion test batches were aged and subsequently retested at 25±1° C. Viscosities were measured at 2 rpm and 20 rpm using a Brookfield RVDVE Heliopath Viscometer unit equipped with T-Spindles. Brookfield measurements run at 2 rpm with a T-spindle are indicative of the overall stability and pumpability of the boric acid dispersion and are characterized as a static viscosity. An initial Brookfield 2 rpm static viscosity of 5,000-25,000 centipoise is needed in order to keep the dispersed boric acid particles well suspended in the dispersion over time. A 3-week aged Brookfield 2 rpm static viscosity that is less than 250,000 centipoise is needed in order to insure that the thixotropic gel that forms on standing can be readily broken down by the applied suction from a positive displacement transfer pump and consequently transformed into a flowable fluid that can be pumped out from storage totes or tanker truckers.

The Brookfield measurements run at 20 rpm are more indicative of a dynamic viscosity value that is useful information in discerning the pump size that is required to provide a required flow rate of a boric acid dispersion as it is being pumped. Furthermore, a Brookfield at 20 rpm dynamic viscosity less than 5,000 centipoise is preferred from the standpoint of having a boric acid dispersion that can be readily injected into wood fiber streams or spray applied onto wood chips or flakes. It should be noted here that the inventive boric acid dispersions exhibit thixotropic rheological behavior so when static aged samples are subsequently re-agitated or pumped they will revert back to their initial viscosity values and upon standing they will gradually increase in viscosity again in a similar manner and to a similar maximum viscosity.

The ideal target Brookfield viscosities arising from the dispersion process at 60% solids are as follows:
An initial Brookfield 2 rpm static viscosity of about 10,000-20,000 centipoise
This process viscosity is high enough to impart sufficient mechanical work through mixing shear into the makedown batch to help attrition down the particle size of the boric acid particles to yield a fine particle size dispersion having a median particle size value of about 10-30 microns. Producing a finer particle size distribution is desirable in terms of enhancing the fire retardant properties of the boric acid product to be utilized in various engineered wood related applications.
This process viscosity is also high enough that it inhibits the settling of the suspended boric acid particles during the subsequent aging period.
This process viscosity is low enough that good mixing can be achieved throughout the dispersion process.
A three week aged Brookfield 2 rpm static viscosity less than about 200,000 centipoise
This aged static viscosity limit is important in terms of maintaining the pumpability of the finished product after transport to customers via totes or tanker trucks.
An initial or re-agitated Brookfield 20 rpm dynamic viscosity less than about 5,000 centipoise
A Brookfield 20 rpm dynamic viscosity less than 5,000 centipoise is important from the standpoint of having a boric acid dispersion that can be readily injected into wood fiber streams or spray applied onto wood chips or flakes.

Based on these Brookfield viscosity and suspension stability criteria, dispersion Expt. #1 using the Tomamine Q-C-15 additive yielded the most desirable results. Tomamine Q-C-15 is a cationic surfactant consisting of an ethoxylated quaternary amine. The degree of ethoxylation present in this kind of an ethoxylated quaternary amine is important as other cationic surfactants in the same family but having a lower EO content were not as effective. Other alternative surfactants that showed good results were ChemWet 75 (an anionic surfactant consisting of sodium dioctyl sulfosuccinate per dispersion Expt. #22), Tomamine E-14-5 (an ethoxylated fatty amine per dispersion Expt. #5) and Ethfac 140 (an ethoxylated Phosphate Ester chemistry per dispersion Expt. #23).

These three alternative surfactants yielded results that were close enough to hitting the viscosity targets that some minor adjustments in the dispersion recipe amounts (added surfactant and xanthan gum) should enable viable formulations to be developed. However, it should be emphasized that keeping the amounts of added surfactant and xanthan gum as low as possible is desirable since they are materials that will burn. It is also interesting and unexpected that the process additives exhibiting superior viscosity reduction and stability characteristics for the dispersion in this experimentation were all surfactants rather than traditional polymeric dispersants. In the high-shear mixing process of the invention, it was unexpectedly found that certain classes of surfactants were more effective in reducing the viscosity and stabilizing the boric acid dispersion as it aged. One preferred overall compositional recipe associated with the most preferred boric acid dispersion arising from Expt. #1 is summarized in Table 1D.

TABLE 1D

Composition of Fine Particle Size Boric Acid Dispersion (per Expt. #1 above)

| Chemical Component | Batch Wt. Amount, g | Wt. % in Formulation |
|---|---|---|
| Deionized Water | 649.15 | 39.34 |
| Boric Acid TG Powder | 986.18 | 59.76 |
| 45% KOH | 8.66 | 0.52 |
| Tomamine Q-C-15[c] | 1.97 | 0.12 |
| Surfynol 440[a] | 2.17 | 0.13 |
| Xanthan Gum[b] | 2.17 | 0.13 |
| Total = | 1650.30 | 100.00 |

Note:
[a]Surfynol 440 (Evonik); Gemini type Nonionic Surfactant having a HLB value = 8.0; functions as low-foaming dynamic wetting agent.
[b]Xanthan gum (100% −60 mesh grade yielding 1% KCl Viscosity = 1,200-1,600 cps); it functions as a pigment suspension aide and helps stick boric acid particles to wood chips or fiber.
[c]The cationic surfactant helps to lower batch viscosity and stabilize the boric acid dispersion.

The viscosity reducing agent of the invention is an important aspect of the inventive boric acid dispersion. The boric acid dispersion requires an effective amount of this viscosity reducing agent for a number of reasons. One is to control the process viscosity of the dispersion when being made. The slurry that is subjected to the high shearing mixing process needs to be thick enough so that attritioning of the boric acid particles occurs. If the slurry is too thin, sufficient attrition would not occur and the desired final particle size would not be attained. In addition, the dispersion would not have the desired stability or improved functionality when used as a fire retardant in wood product manufacture.

The viscosity reducing agent also provides sufficient body to the fluid to keep the boric acid particles suspended during the attrition phase of making the dispersion.

Therefore, the viscosity reducing agent should be one that is used in an effective amount so as to provide an initial Brookfield 2 rpm static viscosity of 5,000 to 25,000 centipoise of the thus-made boric acid dispersion, as measured in the experiments described above, i.e., Brookfield RVDVE Heliopath Viscometer unit using 2 RPM and T-spindle #91. A more preferred range of initial Brookfield 2 rpm static viscosity would be 10,000 to 20,000 centipoise. In terms of an initial Brookfield 20 rpm dynamic viscosity (again using T-spindle #91) a viscosity value that is less than about 5,000 centipoise is desirable for the boric acid dispersion in order to insure it can be readily applied to wood raw material sources via injection or spray application. This 20 rpm dynamic viscosity guideline also applies to aged dispersions of boric acid that have been re-agitated prior to use. Re-agitation of the boric acid dispersion reverses its viscosity properties back to those seen upon initial manufacture. In other words, after a boric acid dispersion has been stored for a period of time, it is preferred that it exhibit a 20 rpm dynamic viscosity of less than 5,000 centipoise when agitated so that it can be readily used in spraying or injecting applications for wood product manufacture.

The measurement of the Brookfield 2 rpm static viscosity over time is also an important aspect of the inventive boric acid dispersion. This measure of aged static viscosity is an indication of the stability and pumpability of the dispersion over time. Having this stability is important because the stability allows the boric acid dispersion to be transported in totes or tank trucks to a manufacturing facility that would use the boric acid dispersion when making engineered wood products. As such, the viscosity reducing agent should be used in an amount that would be effective so that after up to three weeks of time, the aged Brookfield 2 rpm static viscosity of the dispersion should be 250,000 centipoise or less, and more preferably 200,000 centipoise or less.

After the boric acid dispersion is made and a period of time elapses, the dispersion takes on the characteristics of a thixotropic gel. Thus, once the dispersion is then transported to a manufacturing facility for end application use, the dispersion can be agitated and, by shear thinning as a result of the agitation, the dispersion reverts to a viscosity like its initial viscosity which can then be easily pumped or metered into a manufacturing process, e.g., a spraying impregnation. In many instances, the act of pumping the aged dispersion can by itself also provide enough shear to revert the dispersion's viscosity to an initial like viscosity value so long as the positive displacement pump has enough suction to break the gel and begin moving the fluidized material through the delivery system. For purposes of injection or spray application the reverted Brookfield 20 rpm dynamic viscosity should have a viscosity value less than 5,000 centipoise. Again, the stability of the boric acid dispersion over an extended period of time makes the dispersion an ideal candidate to be made at a facility remote from wood product manufacturing facility and shipped to the wood product manufacturing facility for use.

While the measure of the effective amount of the viscosity reducing agent is determined by the initial and aged static viscosity and optionally the dynamic viscosity of the thus-produced boric acid dispersion, the range in terms of the weight percent of the formulation is 0.01 to 1.0%, with a preferred range of 0.05 to 0.20%.

The inventive boric acid dispersions exhibit thixotropic rheology properties which are unique and important characteristics of the dispersions. Their thixotropic properties are critical to their ability to be supplied in a stable form where good pigment suspension is achieved. In addition, the ability of the thixotropic gel produced under static aging conditions to be easily reverted back to a flowable fluid when exposed to shear forces (such as those applied from mechanical stirrers or through the mechanical action of pumps) is also equally important to its end-use utility. Thixotropic behavior can be easily quantified by means of determining a fluid's Thixotropic Index (TI) value. One way a TI value can be determined is by dividing two Brookfield viscosity readings that are recorded at least a factor of 10× apart in shear rate. So for a given dispersion dividing its Brookfield 2 rpm viscosity value by its Brookfield 20 rpm viscosity value yields a representative TI value that can be compared with the calculated TI value of another dispersion to assess their comparative thixotropic nature on a relative basis. The greater the calculated TI value is the more thixotropic the dispersion is; hence the observance of a high TI value is typically associated with the formation of gels. In the case of the preferred boric acid dispersions of the invention, the dispersion experiments #1, #5, #22 and #23 (as listed in Table 1C) are illustrative of the concept when utilizing their reported 2 rpm and 20 rpm viscosity data to calculate the respective TI values by the equation TI value=(BF 2 rpm)/(BF 20 rpm). Hence, using their initial Brookfield viscosity data for calculation purposes, these four dispersion experiments exhibited initial TI values of 4.72, 5.16, 5.45 and 5.22, respectively. Similarly, based on using their 3-week aged Brookfield viscosity data, the four dispersions exhibited aged TI values of 7.91, 10.82, 10.18 and 8.31, respectively. So in each case, the inventive boric acid dispersions exhibited an initial TI value of intermediate magnitude in the range of 4.0-6.0 and were then observed to subsequently increase in TI value over time; however, each dispersion eventually plateaued off at an aged TI value falling into a range from about 7.0-11.5. Aged TI values of 7.0-11.5 are reflective of gels having been formed during the static aging of the boric acid dispersion.

It should also be noted that the formation of too much thixotropy upon aging, as reflected by a TI value of greater than 11.5 is not desirable for the dispersions as the resultant gel so formed can have a Yield Point so high that the gel cannot be easily broken down by the suction applied by various positive displacement pumps. The inability to transform the material into a flowable fluid with a pump alone can be problematic at certain customer locations where there is no ability to re-agitate the delivered product via mechanical stirrers. So in terms of pumpability after aging the boric acid dispersions should have a Brookfield 2 rpm viscosity less than 250,000 centipoise and also be gels having a TI value less than or equal to 11.5. Illustrative examples of boric acid dispersions having problematic pumpability issues are dispersion experiments #20 and #21 in Table 1C. In both instances the 3-week aged Brookfield 2 rpm viscosity value was greater than 250,000 centipoise (their reported readings were 462,500 and 442,500 centipoise, respectively) and they in addition both exhibited a TI value greater than 11.5 (their calculated TI values being 12.28 and 12.59, respectively). Therefore the boric acid dispersions produced from dispersion experiments #20 and #21 do not meet the requirements for the intended end-use fire retardant application.

Given the measurement of 2 rpm and 20 rpm Brookfield viscosities and their relationship to one another in defining a TI value for the dispersions, it is important to understand why these specific measurements are being made. The Brookfield 2 rpm measurement is being made to determine the viscosity of the dispersion under essentially "static conditions" where a very low shear force is being applied. This low 2 rpm reading is particularly important when measuring the viscosity of the gels formed from aging under static conditions as it is essentially a measure of the gel's viscosity. In rheology terminology, the term kinematic viscosity is also used to define the measurement of a fluid's inherent resistance to flow when no external force, other than gravity, is acting on it. In contrast, the higher shear Brookfield 20 rpm measurement is measuring essentially a dynamic viscosity value. Dynamic viscosity is defined as the measurement of a fluid's resistance to flow when an external force is being applied. In the case when 20 rpm is used, the dynamic viscosity of the dispersion product is being measured in its Plowable state as opposed to the viscosity reading at 2 rpm whereby the product is being measured in its non-flowing "static" gel state. Readings at both shear rates are consequently needed in order to better understand the overall rheological properties of the inventive boric acid dispersions.

The experiments above show that there are four kinds of general surfactants that are believed to provide the target viscosities, i.e., a cationic type surfactant, an ethoxylated amine surfactant, a nonionic, anionic or amphoteric surfactant, and an ethoxylated phosphate ester. The experiments also show that among the listing of these surfactants, certain surfactants are even more preferred, i.e., a coco poly (15) oxyethylene methyl ammonium chloride, poly (5) oxyethylene isodecyloxypropylamine, butanedioic acid, 2-sulfo-, 1,4-bis(2-ethylhexyl) ester, sodium salt, and an oleyl 4(EO) phosphate ester.

The inventive boric acid dispersions are heterogeneous systems in that a portion of the bode acid is present in solution and the remainder is present as suspended solid particles. The viscosity reducing agent also possibly functions as a crystal growth inhibitor once the dispersion is made. It is known that with suspended boric acid particles, partial dissolution can occur and this dissolution can subsequently lead to recrystallization thereby producing larger particles and the formation of such larger particles can adversely affect the particle size distribution and stability properties of the dispersion. This crystal growth process in heterogeneous systems is a colloidal phenomenon known as Oswald Ripening. The viscosity reducing agent of the invention acts to inhibit this crystal growth over time, thus leaving the dispersion in a state where, after a prolonged period of time, the boric acid particles will not recrystallize into larger particles that become more difficult to suspend and consequently prevents the dispersion from being easily pumped or metered when used in a wood product manufacturing application. An increase in the dispersion's particle size over time is also not desirable from a fire retardant performance standpoint.

While one viscosity reducing agent is exemplified in the making of the dispersion, a combination of agents could be used if so desired.

As noted above, the boric acid dispersion can also include an optional addition of xanthan gum and a surfactant to improve the wetting of the gum when used during the dispersion high shearing making method. A preferred range of the xanthan gum on a weight basis of the total dispersion would be 0.01 to 0.25 wt. %, with a preferred range of 0.05 to 0.20%. Similar addition ranges would apply for the low-foaming surfactant used with the xanthan gum. The preferred type of surfactant for this purpose is a nonionic surfactant of intermediate HLB value, e.g., an HLB range of 6-14. A particularly useful low foaming nonionic surfactant is Surfynol 440 which compositionally is an ethoxylated 2,4,7,9-tetramethyl 5 decyn-4,7 diol.

As described above, the alkali metal base is also an optional additive when making the boric acid dispersion. When used, the base to boric acid mole ratio amount should be greater than zero and less than 0.01. The presence of the alkali base does affect the pH of the boric acid dispersion. The pH should range between about 4.0 and 6.0. Having the alkali base present in the boric acid dispersion also improves the shelf life of the dispersion. When the alkali metal base is used in the mole ratio amount of 0.004355, the pH of the subsequent dispersion is about 5.5 to 6.0. Without the alkali metal base, the pH of the dispersion is about 4.0 to 4.6.

The alkali metal base should not be present in too large of an amount as this can result in a conversion of the boric acid to a borate and this then creates problems in terms of the stability of the dispersion.

A comparison study was made using a low shear mixing process such as that taught in the Dietrich patent and the results of this study are shown in Table 2.

TABLE 2

Low-Shear Dispersions of Boric Acid employing Higher Levels of Alkali Base but No Surfactant

| Expt.[2] | Alkali Base Type | TG Boric Acid Type | Alkali Base/BA "active basis" mole Ratio[3] | BA Solids Content in Rxn Batch, Wt. % | Batch BF Visc. (Sp# @ 2 rpm)[1], cps | Batch BF Visc. (Sp# @ 20 rpm)[1], cps | Test Batch pH @ 25° C. | Expt'l Observations on Dispersion |
|---|---|---|---|---|---|---|---|---|
| #25 | 50% NaOH | Granular | 0.0200 | 76.4 | 119,600[a] | 10,400[a] | 6.75 | Dispersion not stable; boric acid started to slowly settle almost immediately. |
| #26 | 50% NaOH | Powder | 0.0200 | 76.4 | NA | NA | NA | Unable to Produce; batch was too viscous & couldn't be mixed. |
| #27 | 50% NaOH | Granular | 0.0200 | 60.0 | 175,500[b] | 36,450[b] | 6.76 | Dispersion not stable; BA particles |

TABLE 2-continued

Low-Shear Dispersions of Boric Acid employing Higher Levels of Alkali Base but No Surfactant

| Expt.[2] | Alkali Base Type | TG Boric Acid Type | Alkali Base/BA "active basis" mole Ratio[3] | BA Solids Content in Rxn Batch, Wt. % | Batch BF Visc. (Sp# @ 2 rpm)[1], cps | Batch BF Visc. (Sp# @ 20 rpm)[1], cps | Test Batch pH @ 25° C. | Expt'l Observations on Dispersion |
|---|---|---|---|---|---|---|---|---|
| #28 | 50% NaOH | Powder | 0.0200 | 60.0 | 172,800[a] | 10,300[a] | 6.69 | rapidly settled in <1 min. Dispersion not stable; BA particles rapidly settled in <5 min. |
| #29 | 45% KOH | Granular | 0.0143 | 76.4 | 184,800[a] | 13,460[a] | 5.75 | Dispersion not stable; BA particles rapidly settled in <5 min. |
| #30 | 45% KOH | Powder | 0.0143 | 76.4 | NA | NA | NA | Unable to Produce; batch was too viscous & couldn't be mixed. |
| #31 | 45% KOH | Granular | 0.0143 | 60.0 | 103,000[b] | 26,000[b] | 5.87 | Dispersion not stable; BA started to slowly settle almost immediately. |
| #32 | 45% KOH | Powder | 0.0143 | 60.0 | 364,500[b] | 19,300[b] | 5.77 | Dispersion not stable; BA particles rapidly settled in <5 min. |

Notes:
[1]A Brookfield RVDVE Heliopath Viscometer Unit was employed using T spindles at 2 rpm and then 20 rpm: a) T-B Spindle = Sp# 92; b) T-C Spindle = Sp# 93.
[2]Batch Expt. #25 was produced via low-shear mixing in accordance with the procedure outlined in the Example of U.S. Pat. No. 4,801,404. All the other experimental batches were produced in an analogous fashion except that KOH was used in place of NaOH in some batches and in some instances TG boric acid powder was used in place of the TG Granular boric acid that was originally specified for use in the aforementioned prior art. In the KOH based tests (namely Expts. #29-#32, the NaOH was replaced with KOH on an equivalent active weight replacement basis. No surfactant or dispersant chemistries were employed as process aides in any of these dispersion batches.
[3]Alkali base/boric acid "active basis" mole ratio ranged from about 0.0143 to 0.0200 in these low-shear dispersion experiments. In contrast, the KOH/boric acid mole ratio used in the high-shear dispersion inventive method detailed above is 0.004355. The alkali base/boric acid mole ratio range broadly claimed in U.S. Pat. No. 4,801,404 is 0.01-0.20.

These low-shear mix dispersion experiments without the use of a viscosity reducing agent were carried out in order to comparatively demonstrate the differences in viscosity and stability obtained as compared to the results realized in the inventive process of Expt. #1. As reflected by the results summarized in Table 2, the low-shear mixing process of the prior art and variations thereof do not yield stable, high solids boric acid dispersions that lend themselves to being stored without mixing or being shipped long distances in totes or tanker trucks.

In addition, the finished particle size arising from the prior art low-shear dispersion method is much larger in size which accordingly yields a lower level of fire retardant performance as will be demonstrated in subsequent examples below.

Additional experiments were conducted comparing the effect of using borates instead of boric acid as the starting material when making the dispersion, and the effect of the use of KOH. The results of this dispersion study are shown in Table 3A below. Another study was conducted using a different processing scheme to make the dispersion and the results of this study are shown in Table 3B.

In Table 3A, the first two experiments (Expts. #33 and #34) listed therein summarize the results from a pair of boric acid dispersions produced under high-shear mixing conditions (analogous to the process scheme described above) but made without the use of any surfactant to aide dispersion of the boric acid and help reduce its process viscosity. Expt. #33 employed no KOH or surfactant during the high-shear dispersion while Expt. #34 employed only KOH at a KOH/BA mole ratio of 0.004355. Neither of these boric acid dispersion efforts yielded an acceptable slurry product and this experiment clearly illustrates the importance of using a small quantity of an appropriate surfactant to reduce the process viscosity.

In Table 3A, the dispersion Expts. #35 and #36 show that the preferred surfactant additive from Experiment #1, namely Tomamine Q-C-15, provides no real processing benefit in terms of yielding stable, high solids dispersions of acceptable viscosity when attempting to high-shear disperse various sodium borates such as disodium tetraborate pentahydrate or disodium octaborate tetrahydrate. This test finding also implies that the viscosity reduction benefits seen with Tomamine Q-C-15 when producing boric acid dispersions under high-shear mixing conditions are truly unexpected and are not universal to all boron-based flame retardant additives like the tested borates. Thus, it is preferred to limit the amount of borates added to or formed "in situ" in the inventive boric acid dispersions to very small quantities ranging from 0, on a borate/boric acid mole ratio basis, to about 0.00145 on a borate/boric acid mole ratio basis. A low inconsequential amount of borates can be present in a boric acid dispersion so long as the target solids, particle size target, and viscosity targets of the invention are not altered. For example, in Expt. #1 per Table 1C a fine particle dispersion of boric acid is produced using a small amount of KOH reagent to adjust the final pH of the dispersion. The KOH/Boric Acid mole ratio employed in this dispersion was 0.004355. This small KOH addition therefore results in the "in situ" formation of tripotassium borate ($K_3BO_3$) in an amount equaling about 0.001452 on a borate/boric acid mole ratio basis. On the other hand, in Expt. #37 (per Tables 3A, 3B & 3C) no KOH reagent was employed in the dispersion process for boric acid. So long as the viscosity reducing agent Tomamine Q-C-15 is employed in the dispersion process a viable boric acid dispersion product can be produced without the use of KOH. Since Expt. #37 employs no KOH, then no borates are present in the boric acid dispersion.

scheme for Expt. #37 was that no KOH was employed in the process and some of the Tomamine Q-C-15 surfactant had to be intermittently added in place of the alkali metal base to keep the dispersion fluid. The compositional recipe for dispersion Expt. #37 is shown in Table 3B. Expt. #37 contrasts with Expt. #34, where KOH was used but no surfactant was used and contrasts with Expt. #33 where no KOH and no surfactant were used in the boric acid dispersion process. The initial Brookfield 2 rpm static viscosity obtained via this modified high-shear dispersion process is actually lower than that obtained in Expt. #1 via the process scheme described above. Subsequent aging of this dispersion also showed promise (see tracking results in Table 3C) but it yielded a slight amount of clear syneresis after 2 weeks. However, the formula for this no KOH, high-shear dispersion can be tweaked to better optimize its viscosity properties. Small adjustments in the amount of Tomamine Q-C-15 and xanthan gum used in the formula can readily

TABLE 3A

Test Data on Comparative High-Shear Dispersions of Boric Acid versus Na Borates

| Expt.[b,c] | Boric Acid or Na Borate Chemistry Used[a] | KOH/BA "active basis" mole ratio | Target Solids, Wt. % | Surfactant System Employed | Test Batch pH @ Finished Batch Run Temp. | Test Batch Initial BF Visc. (Sp# @ 2 rpm)[d], cps | Test Batch Initial BF Visc. (Sp# @ 20 rpm)[d], cps | Comments & Observations |
|---|---|---|---|---|---|---|---|---|
| #33 | TG Boric Acid Powder | 0.0000 No KOH used | 60.0 | None | 4.28 @ 18° C. | 810,000 | 41,80 | boric acid particle settling started immediately |
| #34 | TG Boric Acid Powder | 0.004355 | 60.0 | None | 6.01 @ 18° C. | 577,000 | 29,400 | boric acid particle settling started immediately |
| #35 | Borax Pentahydrate | 0.0000 No KOH used | 60.0 | Tomamine Q-C-15 + Surfynol 440 | 9.53 @ 47° C. | 1,733,000 | 230,500 | Formed Firm Semi-solid Mass |
| #36 | Polybor | 0.0000 No KOH used | 60.0 | Tomamine Q-C-15 + Surfynol 440 | 7.71 @ 28° C. | 13,100 | 3,660 | Completely Solidified into Hard Solid Mass within 30 min. |
| #37 | TG Boric Acid Powder | 0.0000 No KOH used | 60.0 | Tomamine Q-C-15 + Surfynol 440 | 4.30 @ 21° C. | 8,700 | 1,900 | Sample Set Up for Tracking; see Table 3B |

Notes:
[a]Borax pentahydrate = disodium tetraborate pentahydrate ($Na_2B_4O_7 \cdot 5H_2O$); Polybor = disodium octaborate tetrahydrate ($Na_2B_8O_{13} \cdot 4H_2O$).
[b]The high-shear dispersions for Expts. #33-#36 were carried out in a manner analogous to Process Scheme #1 except variations in the use of KOH, use of surfactant or use of a Na Borate instead of Boric Acid were employed (as noted) to generate the test matrix. Whenever KOH was employed (as in Expt. #34) 45% active KOH reagent was used in the process.
[c]The high-shear dispersion for Expt. #37 was carried out in accordance to Process Scheme #2 whereby no KOH was employed and the Tomamine Q-C-15 cationic surfactant was added in periodic increments during the dispersion run rather than at the end of the process.
[d]All Brookfield viscosities were measured using a Brookfield RVDVE Heliopath Viscometer Unit equipped with T-spindles run at 2 rpm and then 20 rpm; T-spindles A (#91) through F (#96) were employed as required. All Brookfield viscosity measurements were measured at 25° C.

As discussed above, Expt. #37 in Table 3A shows the effect of high-shear dispersing boric acid with only Tomamine Q-C-15 surfactant (no KOH is employed). The makedown procedure associated with dispersion Expt. #37 is therefore different than that of the process scheme described above for dispersion Expt. #1. The difference in the process accomplish this task. What Table 3C demonstrates is that the addition of the alkali base is not necessarily required to produce a high solids content boric acid dispersion that has adequate stability characteristics and can be transported in bulk for fire retardant use in wood product making applications.

TABLE 3B

Composition of Fine Particle Size Boric Acid Dispersion
(per Expt. #37 and alternative process scheme)

| Chemical Component | Batch Wt. Amount, g | Wt. % in Formulation |
|---|---|---|
| Deionized Water | 649.15 | 39.543 |
| Boric Acid TG Powder | 986.18 | 60.073 |
| Tomamine Q-C-15$^c$ | 1.97 | 0.120 |
| Surfynol 440$^a$ | 2.17 | 0.132 |
| Xanthan Gum$^b$ | 2.17 | 0.132 |
| Total = | 1641.64 | 100.000 |

Note:
$^d$Surfynol 440 (Evonik); Gemini type Nonionic Surfactant having HLB value = 8.0; functions as low-foaming dynamic wetting agent.
$^e$Xanthan gum (100% −60 mesh grade yielding 1% KCl Viscosity = 1,200-1,600 cps); functions as a pigment suspension aide and helps stick boric acid particles to wood chips or fiber.
$^f$The cationic surfactant that helps to lower batch viscosity and stabilize the boric acid dispersion.

TABLE 3C pH & Viscosity Tracking$^a$ of Boric Acid Dispersion (Expt. #37 made by alternate process scheme)

| Expt. | Batch Specific Gravity, g/ml | Initial pH & BF Visc., cps | Aged pH & BF Visc.$^a$, cps (after 3 days) | Aged pH & BF Visc.$^a$, cps (after 1 week) | Aged pH & BF Visc.$^a$, cps (after 2 weeks) | Comments Upon Aging |
|---|---|---|---|---|---|---|
| #37 (from Table 3A) | 1.1820 | Sp #91 2 rpm = 8,700 20 rpm = 1,900 pH = 4.30 | Sp #91 2 rpm = 44,900 20 rpm = 7,620 pH = 4.09 | Sp #92 2 rpm = 131,400 20 rpm = 13,320 pH = 4.26 | Sp #92 2 rpm = 160,800 20 rpm = 17,360 pH = 4.17 | Slight Syneresis Observed after 2 weeks |

Notes:
$^a$Boric acid dispersion batch (Expt. #37) was aged and periodically retested at 25 ± 1° C.
$^b$All Brookfield Viscosities were measured using a Brookfield RVDVE Heliopath Viscometer Unit equipped with T-spindles run at 2 rpm and then 20 rpm; T-spindles A (#91) through F (#96) were employed as required. All Brookfield viscosity measurements were measured at 25° C.

In summary, given the use of one or more of the preferred viscosity reducing surfactants while employing a process scheme that uses or does not use KOH, the data in Tables 3A-3C demonstrate that fine particle size boric acid dispersions can be readily produced which can exhibit a finished pH of 4.0-6.0 depending on the amount of alkali metal base, such as KOH, that's employed in the high-shear dispersion process. The amount of active basis KOH suitably employed in the boric acid dispersions can range from an alkali metal base/boric acid mole ratio from zero to about 0.01 whereby a molar ratio of about 0.004 is particularly useful.

In connection with the fire retardant properties of the boric acid dispersion, experiments were conducted to assess the performance of the inventive boric acid dispersion in different engineered wood related applications where fire retardancy is measured. A first experiment involved making OSB test panels and measuring flame spread for the panels.

In this experiment, a 6 inch by 12 inch wood test panel specimen (rather than the 6 inch×18 inch dimension specified in the standard radiant panel ASTM E162 protocol) was mounted within a metal specimen holder then inclined at an angle of 30° while facing toward a vertical radiant heat source panel. The upper 6 inch wide edge of the specimen is located 4¾ inches from the radiant heat panel. The radiant heat panel consists of porous, refracting material mounted within a cast-iron frame, 10 by 19 in. in overall dimensions, and heated by a gas-air mixture. The radiant heat panel is supplied by a 32,000 BTU propane fueled system equipped with a gas flow controller and regulating valves to facilitate its operation at a radiant temperature of 1238° F. (670° C.).

An exhaust stack and hood, located above the wood specimen, collect and exhaust the products of combustion. The exhaust stack is used for internal mounting of eight thermocouples which collectively measure the average temperature of the combustion gases being produced. A small pilot burner of ⅛-inch stainless steel tubing (³⁄₁₆ inch OD) is located horizontally so that a 2-3 inch flame of gas, premixed with air, will emit from the burner tip near the top edge of the wood test panel specimen.

For the surface flammability test, the gas-air mixture is passed through the radiant panel and burned for 30 minutes, then adjusted to maintain a heat output equivalent to a black body at a temperature of 1238° F.±7 (670° C.±4) as measured by a radiation pyrometer. The hood's blower is adjusted to produce a velocity of 250 ft./min. at the top of the stack when the radiant panel is at its standard operating temperature. The pilot burner is ignited, adjusted to give a 2-3 inch flame, and positioned in front of the radiant panel so as to be within ½ inch of touching the center top edge of the test panel when placed in test position. The test panel within the specimen frame is then moved into exposure position. The specimen is exposed to the radiant heat and pilot flame for 11 minutes or until the flame front has progressed down the wood test panel 11 inches (whichever comes first). The time for the flame front to progress every 1 inch on the face of the specimen and the maximum temperature rise of the stack thermocouples are recorded.

In preparing test panels for surface flammability tests using the above radiant heat source apparatus, all the 6 inch by 12 inch wood panels are first conditioned by allowing them to sit in a mechanical forced air oven at 60° C. for 24 hours. This drying step is then followed by a one hour cooling period enclosed in a Ziploc plastic bag to ensure consistent moisture content amongst the panels prior to their comparative evaluation.

Figure 3:
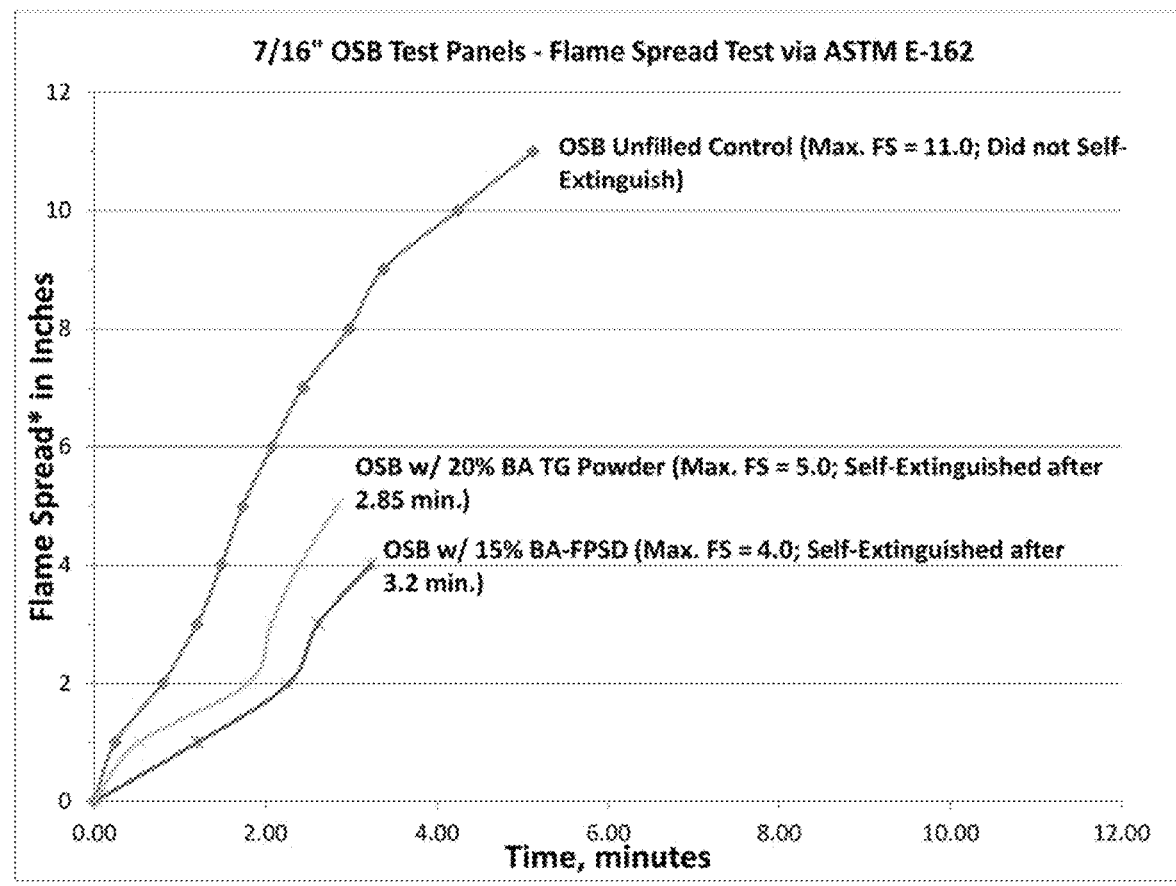
FIG. 3 is a graph showing comparative flame spread data on OSB for a boric acid technical grade powder vs. the inventive boric acid dispersion.

In the testing below, a standard ⁷⁄₁₆" thick OSB wood panel using Southern Yellow Pine (SYP) wood flakes was produced using standard commercial operating conditions known in the industry. The OSB panels were produced using a 5% addition of pMDI (Covestro's Mondur 541-Light) as the adhesive. The boric acid TG Powder (at a 20% loading in the board) was dry blended with the wood flakes+pMDI adhesive prior to being formed into a mat and pressed. In the case of using the inventive fine particle size boric acid dispersion (60% solids with a composition in accordance with Expt. #1), the dispersion was spray applied onto the SYP wood flakes in the blender unit containing wood flakes+pMDI adhesive so as to ultimately yield a 15% by wt. loading of boric acid in the finished OSB panel. The surface flammability test results for these OSB panels are shown in FIG. 3. The OSB panel using the inventive dispersion, designated as BA-FPSD, exhibited a shorter flame spread distance even at a lower loading level and its flame self-extinguished after 3.2 minutes. It should be noted that for FIG. 3, the maximum flame spread is measured after a 11 minute test burn period or stopped after reaching the 11 inch mark or recorded at the point of self-extinguishment of the flame (whichever event comes first). What FIG. 3 shows is an unexpected result in that the loading of the OSB panel with only 15% boric acid produced a better fire retardancy than a product with more boric acid, i.e., 20% loading. The lower amount of boric acid is also significant as this means that the wood product weighs less but has at least equivalent fire retardancy properties. The lowering of the boric acid amount is also important as excessive use of fire retardant additives like boric acid in the wood product can compromise the strength and structural integrity of the wood product so using less boric acid assists the manufacturer of the wood product in meeting the strength and structural standards for the wood product's end-use application.

Another aspect of the invention is the use of the boric acid dispersion as the principal pigment component in a waterborne coating formulation to improve the fire retardancy of a wood product or other material. The following shows an example of a coating formulation using the boric acid dispersion and a waterborne binder to yield a fire retardant coating formulation that is applied to an engineered wood substrate to produce a coated wood product having improved flame spread properties. Such fire retardant coatings can also be utilized to coat other types of wood such as dimensional lumber.

Fire retardant coating formulations were respectively produced by combining the boric acid dispersions with a chemically compatible waterborne organic binder. The boric acid particles function as both a pigment and as a fire retardant additive in the coating formulation. The waterborne organic binder is polymeric and used in an effective amount to assist in at least binding the boric acid particles of the boric acid dispersion to the wood product being coated; however, the binder can also affect other coating film properties such as its flexibility and durability, the coating's ability to be nailed without cracking, its water and weather resistance properties and the like.

One example of an organic binder that can be successfully employed with the boric acid dispersion is an EVCL based polymer dispersion. This kind of binder is available commercially under the tradename Vinnol 4514 (manufactured by Wacker Polymers) and it is believed to be particularly suitable for this application as it exhibits the following properties.

The polymeric coating binder has a relatively neutral pH (hence better pH compatibility with the boric acid dispersions);

The polymeric coating binder itself has some fire resistance properties (due to its vinyl chloride content) which provides an additional performance benefit;

The polymeric coating binder has a low minimum film formation temp (MFFT). A MFFT≤25° C. is particularly advantageous in this application because that means you can largely avoid the use of any coalescent solvents in the coating formulation and this allows one to keep the VOC level low which is viewed as a big positive in an engineered wood mill facility whose emissions are closely monitored.

The polymeric coating binder has a low glass transition (Tg) temperature. The Tg for the Vinnol 4514 is reported to be 12° C. Having a Tg value ≤25° C. is particularly desirable in this application because that means the coating film will be tough but flexible. Since the coating will be applied to an engineered wood panel that may be nailed in subsequent construction use (such as panels of OSB), the applied coating needs to be flexible enough that nailing the panel does not crack or chip off the applied fire retardant coating.

It should be noted that Vinnol 4514 is one illustrative example of a useful polymeric binder but other binder chemistries could also be used with the inventive boric acid dispersion with good success so long as they generally meet the pH compatibility, MFFT and Tg property requirements outlined above. It should also be understood that the coating formulation using the waterborne binder and boric acid dispersion can use other ingredients as would be known in the art for coating formations. These other ingredients can include various mineral pigments, $TiO_2$ pigment, thickeners, surfactants, dispersing agents, preservatives, defoamers, solvent, etc. and they can be used in amounts typically found in coating formations.

The following Table 4A shows an example of simplified coating formulations. The Table lists the ingredients for two formulations. One uses a granular boric acid low-shear dispersed in water in accordance with the prior art teachings of Dietrich and the other formulation uses the fine particle size boric acid dispersion of the invention.

TABLE 4A

Boric Acid Containing Coating Formulations for Surface Flammability Testing

| | Coating Expt. 38B using Granular boric acid Disp. | Coating Expt. 38C using BA-FPSD |
|---|---|---|
| Formula Ingredient | | |
| DI Water | 15.6 g | 0.0 |
| Granular boric acid disp. (Expt. #25 having Total Solids = 77.4%; BA Content @ 76.4%)[a] | 54.3 g | — |
| Fine particle size boric acid disp. (Expt. #1 having total solids = 60%) | — | 70.0 |
| Xanthan gum[b] | 0.1 g | — |
| Binder (Vinnol 4514 @ 50% solids)[c] | 30.0 g | 30.0 |
| Total = | 100.0 g | 100.0 |
| Coating Properties | | |
| Total solids content, Wt. % | 57.1% | 57.0% |
| Pigment solids content, Wt. % | 42.0% | 42.0% |
| Pigment/binder ratio (active basis w/w ratio) | 2.8:1 | 2.8:1 |

Notes:
[a]Prior art boric acid dispersion per Expt. #25 was produced from TG granular boric acid in accordance with the procedure used in U.S. Pat. No. 4,801,404.
[b]Xanthan gum (100% −60 mesh grade yielding 1% KCl Viscosity = 1,200-1,600 cps).
[c]Vinnol 4514 binder (ethylene-vinyl chloride based emulsion polymer from Wacker Polymers).

While coating formulation Expt. #38C used 30% of the waterborne organic binder, a wt. % range of the amount of the waterborne binder in the total formulation of the boric acid dispersion and waterborne binder can range between about 10 and 45% by wt., and more preferably 20-40% by wt. In terms of the coating thickness, a 6 mil thickness of wet coating was applied to the wood substrate in Expt. #38 however different thicknesses of the fire retardant coating can be used, e.g., from 2-10 mil. Based on the coating formulation's specific gravity (1.171 g/ml) and the 6 mil wet coating film thickness, Expt. #38 was applied at a wet weight of about 16.6 g/ft.$^2$ to the wood substrate. Given the coating formulation's solids content (57.0%) this then translates to about 9.45 g/ft.$^2$ of dry basis coating being applied. For an applied wet film thickness ranging from 2-10 mils this then corresponds to dry basis coating weights of about 3-16 g/ft.$^2$. If any of the optional coating ingredients previously disclosed are utilized in other variations of the formulation, then the % solids content and specific gravity of the coating can change and the applied coating weights will change accordingly.

The waterborne coating formulations from Table 4A were then coated onto panels of a commercial grade particle board (PB) manufactured by Georgia Pacific that was 0.75 inch thick. A 6.0 mil wet film thickness was applied and allowed to air dry overnight. The PB panels were only coated on one side which is the side that was subsequently directed towards the radiant heat source in the surface flammability test. An uncoated PB panel was also tested (Expt. 38A) to serve as a comparative control. The panels were all tested in accordance with the modified radiant panel ASTM E162 test protocol as described above and the results are comparatively summarized in Table 4B.

Review of the flame spread testing results summarized in Table 4B indicates that the PB coating containing the inventive fine particle size dispersion of boric acid (Coated Test Panel 38C) yielded the shortest flame spread value. This flame spread data consequently illustrates the greater fire retardant efficiency of the inventive dispersion of boric acid as compared to using the prior art boric acid dispersion.

TABLE 4B

Flame Spread Determination[a] of Coated Particle Boards[b, c]

| Flame Spread Inches | Expt. 38A (Control; Uncoated Std. PB) (min:sec) | Expt. 38B (Std. PB Coated with Granular BA[e]) (min:sec) | Expt. 38C (Std. PB Coated with BA-FPSD[f]) (min:sec) |
| --- | --- | --- | --- |
| 1 | 0:10 | 0:48 | 0:45 |
| 2 | 1:23 | 2:15 | 2:45 |
| 3 | 2:06 | 2:50 | 3:39 |
| 4 | 2:45 | 3:30 | 4:28 |
| 5 | 3:30 | 4:15 | 5:28 |
| 6 | 4:18 | 5:05 | 6:37 |
| 7 | 5:17 | 6:10 | 8:01 |
| 8 | 6:22 | 7:38 | 9:56 |
| 9 | 7:31 | 9:06 | — |
| 10 | 9:08 | 11:00 | — |
| 11 | 10:59 | — | — |
| Self-Extinguishment Observed | No, Still Burning after 11:00 min. | No, Still Burning after 11:00 min. | No, Still Burning after 11:00 min. |
| Max. Flame Spread during Test[d], inches | Max FS = 11" | Max FS = 10" | Max FS = 8.7" |

Notes:
[a]Flame spread determinations were carried out using a modified ASTM E162 radiant panel test methodology employing 6" × 12" PB panels.
[b]Particle board employed in the study was a Georgia Pacific, 0.75" thick, standard grade panel purchased from Home Depot.
[c]A 6.0 mil wet film thickness was applied to the particle board panels on one side using a wire-wound applicator rod and the applied coating was allowed to air dry overnight. Board was burned with the coated side facing the radiant heat panel.
[d]Maximum flame spread is measured after an 11 minute test burn period or stopped after reaching the 11 inch mark or recorded at the point of self-extinguishment of the flame (whichever event comes first).
[e]Coating contains the prior art boric acid dispersion (per Expt. #25) that was produced from a TG granular boric acid in accordance with the procedure used in U.S. Pat. No. 4,801,404.
[f]Waterborne coating formula utilizes the fine particle size dispersion of boric acid obtained from Expt. #1.

Yet another experiment was performed to assess the flame spread properties of wood products treated with different boric acid dispersions. In this experiment, the flame spread properties of some laboratory-produced wood panels were comparatively evaluated. In order to accentuate performance differences very thin wood panels only 0.25 inches in thickness were produced. Fine Southern Yellow Pine wood shavings (much smaller in size than wood flakes used in commercial OSB board mills) were employed. The SYP wood shavings were purchased from PETCO and had a typical dimension of about 10 mm×15 mm×0.1 mm thickness. The boric acid and pMDI adhesive additives were thoroughly pre-blended with the SYP wood shavings prior to forming the mats and pressing the test boards. Three test boards were produced using an 18 inch×18 inch Wabash Press. One board (Expt. 39A) was unfilled to serve as a comparative control. The other two Boards (Expt. 39B & 39C) were loaded with a 15% addition level of boric acid additive. All test boards utilized an equivalent level of pMDI (Mondur 541-Light) adhesive. In Expt. 39B, the test board was produced using the boric acid dispersion prepared in Expt. #25. Expt. #25 was the experiment that produced a dispersion of boric acid using granular TG boric acid and NaOH as the alkali metal base, which follows the procedure outlined in the Dietrich patent discussed in the Background Art section above. In Expt. 39C, the inventive fine particle size dispersion of boric acid from Expt. #1 was utilized to produce the test board. Using the modified ASTM E162 testing protocol previously described above, the Flame Spread properties were then determined.

Results for the three test boards are comparatively summarized in Table 5. The maximum flame spread value for Test Board Expt. 39C was significantly less than the corresponding value observed for Test Board Expt. 39B. In addition, the flame front for Test Board Expt. 39C self-extinguished after 8 min. 56 sec. whereas the other boards continued to burn through the entire test period. This data again illustrates the greater fire retardant efficiency of the inventive fine particle dispersion of board as compared to using the prior art boric acid dispersion.

TABLE 5

Flame Spread Determination[a] of Wood Test Panels with Internal Boric Acid Additives

| Flame Spread Inches | Expt. 39A (Control; Unfilled Board) (min:sec) | Expt. 39B (Board w/ 15% Granular BA[c]) (min:sec) | Expt. 39C (Board w/ 15% BA-FPSD[d]) (min:sec) |
| --- | --- | --- | --- |
| 1 | 0:22 | 0:47 | 0:54 |
| 2 | 1:45 | 5:43 | 5:11 |
| 3 | 2:40 | 6:14 | 5:50 |
| 4 | 3:26 | 6:52 | — |
| 5 | 4:22 | 7:31 | — |
| 6 | 5:42 | 10:40 | — |
| 7 | 6:38 | — | — |
| 8 | 7:40 | — | — |
| 9 | 8:44 | — | — |
| 10 | 10:07 | — | — |

TABLE 5-continued

Flame Spread Determination[a] of Wood Test Panels with Internal Boric Acid Additives

| Flame Spread Inches | Expt. 39A (Control; Unfilled Board) (min:sec) | Expt. 39B (Board w/ 15% Granular BA[c]) (min:sec) | Expt. 39C (Board w/ 15% BA-FPSD[d]) (min:sec) |
|---|---|---|---|
| 11 | — | — | — |
| Self-Extinguishment Observed | No, Still Burning after 11:00 min. | No, Still Burning after 11:00 min. | Yes, Stopped Burning after 8:56 min. |
| Max. Flame Spread During Test[b], inches | Max FS = 10.7" | Max FS = 6.5" | Max FS = 3.2" |

Notes:
[a]Flame spread determinations were carried out using a modified ASTM E162 radiant panel test methodology employing 6" × 12" wood panels.
[b]Maximum flame spread is measured after an 11 minute test burn period or stopped after reaching the 11 inch mark or recorded at the point of self-extinguishment of the flame (whichever event comes first).
[c]Board contains boric acid dispersion (per Expt. #25) that's produced from a TG Granular boric acid in accordance with the procedure in U.S. Pat. No. 4,801,404.
[d]The board utilizes the fine particle size dispersion of boric acid obtained from Expt. #1.

One additional experiment was conducted to assess the effect of the use of the inventive boric acid dispersion on flame retardancy when used as an additive in medium density fiberboard (MDF). In this experiment, the inventive fine particle size boric acid dispersion produced in accordance with Expt. #1 was utilized as a flame retardant additive in a MDF panel of 0.75 inch thickness. This boric acid dispersion was introduced to the ligneous fiber material at the refiner at an addition level to yield 15% by wt. of boric acid in the finished MDF panel. However, those skilled in the art of manufacturing MDF panels will readily recognize that other locations for addition of the Boric Acid dispersion are possible such as in the blow line between the refiner and the drier. FIG. 4 of U.S. Pat. No. 7,651,591 illustrates a conventional MDF panel forming process and the addition of the dispersion as an example could be added between the refining step 415 and the drying step 430.

To serve as a comparative control, an unfilled MDF panel was also produced. The flame spread properties of the unfilled and boric acid-filled MDF panels (Board Expts. 40A & 40B, respectively) were then determined using the modified ASTM E162 testing protocol previously discussed and described above. The results obtained from this flame spread testing are summarized in Table 6.

The flame front on test board Expt. 40B self-extinguished just prior to the 11:00 min. mark. This board exhibited a maximum flame spread of just 6.7 inches whereas the unfilled test board, board Expt. 40A, reached the end of the 11-inch test length in 10 min. 23 sec. and was subsequently observed to still be burning after the 11:00 min. mark.

The excellent fire resistance properties exhibited by test board Expt. 40B were then subsequently determined by an outside lab to yield a Class A fire rating as determined by ASTM E84 Steiner Tunnel testing. A Class A rating for wood materials are those exhibiting a Flame Spread Index value of 0-25 by E84. In comparison, a typical FSI value reported in the technical literature for a 0.75 inch thick MDF panel is FSI=120 (Class C). Additional details on reported FSI values for various wood products can be found in the American Wood Council publication "Flame Spread Performance of Wood Products used lbr Interior Finish," copyright 2017. What this experiment reveals is that the inventive boric acid dispersion can be used to make an MDF panel, which normally has a Class C rating, have a Class A rating.

TABLE 6

Flame Spread Determination[a] for MDF Panels[b] Utilizing BA-FPSD

| Inches | Expt. 40A (Control; Unfilled MDF Panel) (min:sec) | Expt. 40B (MDF Test Panel w/ 15% BA-FPSD[d]) (min:sec) |
|---|---|---|
| 1 | 0:25 | 2:52 |
| 2 | 1:26 | 4:04 |
| 3 | 2:13 | 5:10 |
| 4 | 2:51 | 6:20 |
| 5 | 3:29 | 7:35 |
| 6 | 4:15 | 9:19 |
| 7 | 5:12 | |
| 8 | 6:22 | |
| 9 | 7:25 | |
| 10 | 8:52 | |
| 11 | 10:23 | |
| Self-Extinguishment Observed | No, Still Burning after 11:00 min | Yes, Stopped Burning just Prior to 11:00 min. Mark. |
| Max. Flame Spread During Test[c], inches | Max FS = 11" | Max FS = 6.7" |

Notes:
[a]Flame spread determinations were conducted using test protocol based on a modified ASTM E162 radiant panel methodology employing 6" × 12" MDF test panels.
[b]Medium Density Fiberboard (MDF) test panels of 3/4" thickness were produced and tested. The Boric Acid content in MDF test panel Expt. 40B was approximately 15% by weight.
[c]Maximum flame spread is measured after an 11 minute test burn period or stopped after reaching the 11 inch mark or recorded at the point of self-extinguishment of the flame (whichever event comes first).
[d]Test board utilized the fine particle size dispersion of boric acid produced in accordance with Expt. #1.

As such, an invention has been disclosed in terms of preferred embodiments thereof which fulfills each and every one of the objects of the present invention as set forth above and provides a new and improved fire retardant additive in the form of a boric acid dispersion, its use in making engineered wood products, and its use in creating coating formulations to coat wood products and coated products from this method.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. An aqueous boric acid dispersion comprising boric acid particles having a median particle size range of less than 44 microns and a solids content of boric acid particles of 50% or greater, the boric acid dispersion further comprising:
    an effective amount of at least one viscosity reducing agent such that the boric acid dispersion has an initial static viscosity of about 5,000 to about 25,000 centipoise and a three week aged static viscosity of less than 250,000 centipoise,
    an optional amount of an alkali metal base, wherein the alkali metal base/boric acid mole ratio in the boric acid dispersion ranges from zero to about 0.01; and
    the balance water,
    wherein the initial and aged static viscosities are measured using a Brookfield RVDVE heliopath viscometer unit equipped with T-spindles and are run at 2 rpm and 25 degrees C.

2. The aqueous boric acid dispersion according to claim 1, wherein the boric acid dispersion has a dynamic viscosity of less than 5000 centipoise, the dynamic viscosity measured using a Brookfield RVDVE heliopath viscometer unit equipped with T-spindles and are run at 20 rpm and 25 degrees C.

3. The aqueous boric acid dispersion according to claim 1, wherein the boric acid dispersion has a thixotropic index value less than about 11.5.

4. The aqueous boric acid dispersion according to claim 1, wherein the solids content is equal to or greater than 55%.

5. The aqueous boric acid dispersion according to claim 1, wherein median particle size is less than about 21 microns or in a range of about 10 to about 30 microns.

6. The aqueous boric acid dispersion according to claim 1, wherein the at least one viscosity-reducing agent is selected from the group consisting of a cationic type surfactant, an ethoxylated amine surfactant, a nonionic, anionic or amphoteric surfactant, and an ethoxylated phosphate ester.

7. The aqueous boric acid dispersion according to claim 6, wherein the cationic type surfactant is selected from the group consisting of coco poly (15) oxyethylene methyl ammonium chloride, isodecyloxypropyl bis-(2-hydroxyethyl) methyl ammonium chloride, isotridecyloxypropyl bis-(2-hydroxyethyl) methyl ammonium chloride, and dicocoalkyldimethyl ammonium chloride.

8. The aqueous boric acid dispersion according to claim 6, wherein the ethoxylated amine surfactant is selected from the group consisting of poly (5) oxyethylene isodecyloxypropylamine, and poly (5) oxyethylene isotridecyloxypropylamine.

9. The aqueous boric acid dispersion according to claim 6, wherein the nonionic, anionic or amphoteric surfactant is selected from the group consisting of poly (6) oxyethylene $C_9$-$C_{11}$ aliphatic alcohol, poly (5) oxyethylene iso-$C_{13}$ alcohol, ethylene oxide/propylene oxide copolymer, polyethylene glycol 200, sodium octyliminodipropionate, and butanedioic acid, 2-sulfo-, 1,4-bis(2-ethylhexyl) ester, sodium salt.

10. The aqueous boric acid dispersion according to claim 6, wherein the phosphate ester is selected from the group consisting of oleyl 4(EO) phosphate ester and oleyl 6(EO) phosphate ester.

11. The aqueous boric acid dispersion according to claim 6, wherein the at least one viscosity reducing agent is selected from the group consisting of coco poly (15) oxyethylene methyl ammonium chloride, poly (5) oxyethylene isodecyloxypropylamine, butanedioic acid, 2-sulfo-, 1,4-bis (2-ethylhexyl) ester, sodium salt, and oleyl 4(EO) phosphate ester.

12. The aqueous boric acid dispersion according to claim 1, wherein the alkali metal base is one of NaOH and KOH.

13. The aqueous boric acid dispersion according to claim 1, wherein the alkali metal base/boric acid mole ratio ranges from about 0.001 to about 0.007.

14. The aqueous boric acid dispersion according to claim 1, further comprising at least one of an effective amount of a nonionic surfactant of intermediate HLB value to assist in the ease of introduction of a xanthan gum additive during the manufacture of the boric acid dispersion and an effective amount of the xanthan gum for improving the suspension of the boric acid particles and for improving the adherence between a wood product and boric acid particles used with the wood product to improve fire retardancy thereof.

15. The aqueous boric acid dispersion according to claim 14, wherein the amount of the nonionic surfactant in the boric acid dispersion ranges from about 0.01 to about 0.25 wt. % and the amount of the xanthan gum in the boric acid dispersion ranges from 0.01 to about 0.25 wt. %.

16. The aqueous boric acid dispersion according to claim 1, wherein the initial static viscosity ranges between about 10,000 and about 20,000 centipoise and the three week aged static viscosity is 200,000 centipoise or less.

17. A coated wood product having improved fire retardancy comprising:
  a wood product and a coating formulation covering at least one surface of the wood product, the coating formulation comprising:
  the boric acid dispersion of claim 1 and a waterborne binder, the waterborne binder being relatively neutral in pH, having a minimum film formation temperature of 25° C. or less, and a glass transition temperature less than 25° C., the water borne binder being about 10-40% by weight of the coating formulation.

18. The coated wood product of claim 17, wherein the wood product is one of particle board, oriented strand board, medium density fiberboard and dimensional lumber.

19. A method of coating of a wood product to improve fire retardancy comprising:
  a) providing the coating formulation comprising the boric acid dispersion of claim 1 and a waterborne binder, the water borne binder being relatively neutral in pH, having a minimum film formation temperature of 25° C. or less, and a glass transition temperature less than 25° C., the waterborne binder being about 10-40% by weight of the coating formulation;
  b) applying an effective amount of the coating formulation to at least one surface of the wood product to improve the fire retardancy of the wood product and form a coated wood product; and
  c) drying the coated wood product.

20. The method of claim 19, wherein the wood product is one of particle board, oriented strand board, medium density fiberboard and dimensional lumber.

21. The aqueous boric acid dispersion according to claim 5, wherein the solids content is equal to or greater than 60%.

22. The aqueous boric acid dispersion according to claim 1, wherein the alkali metal base/boric acid mole ratio ranges from about 0.002 to about 0.006.

23. A method of making a wood product using wood chips, wood fiber or wood flakes and an adhesive to form the wood product comprising:
  a) providing the wood chips, fiber or flake and the adhesive;
  b) providing the boric acid dispersion of claim 1; and
  c) applying the boric acid dispersion and adhesive onto one or more surfaces of the wood chips, fiber or flakes to form the wood product and improve the fire retardancy of the wood product.

24. The method of claim 23, wherein the wood product is one of particle board, oriented strand board, and medium density fiberboard.

* * * * *

UNITED STATES PATENT AND TRADEMARK OFFICE
CERTIFICATE OF CORRECTION

PATENT NO. : 10,703,009 B2  
APPLICATION NO. : 16/108325  
DATED : July 7, 2020  
INVENTOR(S) : Freeman et al.

Page 1 of 1

It is certified that error appears in the above-identified patent and that said Letters Patent is hereby corrected as shown below:

In the Specification

Column 12, Line 7:  
"dispersion fonnulation when used. It helps as a pigment"  
Should read:  
"dispersion formulation when used. It helps as a piment"

Column 23, Line 15:  
"sured in its Plowable state as opposed to the viscosity"  
Should read:  
"sured in its flowable state as opposed to the viscosity"

Column 35, Line 64:  
"mance of Wood Products used Ibr Interior Finish," copyright"  
Should ready:  
"mance of Wood Products used for Interior Finish," copyright"

Signed and Sealed this  
Twenty-fourth Day of November, 2020

Andrei Iancu  
*Director of the United States Patent and Trademark Office*